(12) United States Patent
Lee et al.

(10) Patent No.: US 9,674,311 B2
(45) Date of Patent: Jun. 6, 2017

(54) ROBUST HEADER COMPRESSION FOR RELAY NODES

(75) Inventors: Jiwoong Lee, Berkeley, CA (US); Sai Yiu Duncan Ho, San Diego, CA (US); Fatih Ulupinar, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 228 days.

(21) Appl. No.: 12/829,770

(22) Filed: Jul. 2, 2010
(Under 37 CFR 1.47)

(65) Prior Publication Data
US 2011/0158166 A1    Jun. 30, 2011

Related U.S. Application Data

(60) Provisional application No. 61/234,239, filed on Aug. 14, 2009.

(51) Int. Cl.
*H04W 40/04* (2009.01)
*H04L 29/06* (2006.01)
(Continued)

(52) U.S. Cl.
CPC ............. *H04L 69/04* (2013.01); *H04L 69/22* (2013.01); *H04W 28/06* (2013.01); *H04B 7/2606* (2013.01); *H04W 84/047* (2013.01)

(58) Field of Classification Search
CPC ...... H04W 28/06; H04W 80/04; H04L 69/04; H04L 69/22; H04L 12/4633; H04L 29/0604; H04L 29/0653; H04B 7/2606
See application file for complete search history.

(56) References Cited

U.S. PATENT DOCUMENTS 6,839,339 B1 * 1/2005 Chuah ............... H04L 29/06027
                                                           370/349
2002/0093938 A1 * 7/2002 Tourunen ................ H04L 29/06
                                                           370/349

(Continued)

FOREIGN PATENT DOCUMENTS

CN          1684466 A    10/2005
CN       101075937 A    11/2007
(Continued)

OTHER PUBLICATIONS

Digital cellular telecommunications system (Phase 2+); Universal Mobile Telecommunications System (UMTS) ; General Packet Radio Service (GPRS); GPRS Tunnelling Protocol (GTP) across the Gn and Gp interface (3GPP TS 29.060 version 6.20.0 Release 6) Technical Specification, European Telecommunications Standards Institute (ETSI), 650, Route Des Lucioles ; F-06921 Sophia-Antipolis ; France, No. V6.20.0, Jun. 1, 2009 (Jun. 1, 2009), XP014044652; sections 6,7.

(Continued)

*Primary Examiner* — David Oveissi
(74) *Attorney, Agent, or Firm* — James T. Hagler

(57) ABSTRACT

Systems and methodologies are described that facilitate compressing headers for relay nodes. In particular, a robust header compression (RoHC) profile can be defined for general packet radio service (GPRS) tunneling protocol (GTP) headers. Upon receiving a packet with one or more GTP headers, an access point or relay node can determine whether the one or more GTP headers are compressible and can apply the RoHC profile to compress the one or more GTP headers. In addition, the packet can include a baseheader encapsulated by the one or more GTP headers, which can also be compressed according to a RoHC profile specific (Continued)

to the baseheader. Moreover, RoHC compressed headers can be decompressed according to the GTP RoHC profile.

60 Claims, 13 Drawing Sheets

(51) Int. Cl.
   *H04W 28/06* (2009.01)
   *H04B 7/26* (2006.01)
   *H04W 84/04* (2009.01)

(56) References Cited

U.S. PATENT DOCUMENTS

| | | | |
|---|---|---|---|
| 2004/0001508 A1 | 1/2004 | Zheng et al. | |
| 2005/0265383 A1* | 12/2005 | Melpignano | H04L 1/0014 370/465 |
| 2005/0286523 A1* | 12/2005 | Liao | H04L 47/10 370/389 |
| 2009/0003296 A1* | 1/2009 | Zheng | H04W 92/045 370/338 |
| 2009/0073906 A1* | 3/2009 | Yi | H04W 28/18 370/310 |
| 2009/0080422 A1 | 3/2009 | Lee et al. | |
| 2009/0109924 A1* | 4/2009 | Sato | H04W 36/0055 370/331 |
| 2009/0310622 A1* | 12/2009 | Whited | H04W 28/06 370/470 |
| 2010/0202458 A1 | 8/2010 | Sato | |
| 2011/0019695 A1* | 1/2011 | Wu et al. | 370/477 |

FOREIGN PATENT DOCUMENTS

| | | | |
|---|---|---|---|
| EP | 1122925 | A1 | 8/2001 |
| EP | 1362453 | B1 | 1/2006 |
| JP | 2004512743 | A | 4/2004 |
| KR | 100610658 | B1 | 8/2006 |
| TW | I302794 | B | 11/2008 |
| WO | WO-0225895 | A1 | 3/2002 |
| WO | WO-0233931 | A1 | 4/2002 |
| WO | WO-2006123980 | A1 | 11/2006 |
| WO | WO-2008115116 | A1 | 9/2008 |
| WO | WO-2009057204 | A1 | 5/2009 |

OTHER PUBLICATIONS

International Search Report and Written Opinion—PCT/US2010/045646—ISA/EPO—Jul. 28, 2011.
L-E Jonsson G Pelletier K Sandlund Ericsson: "The Robust Header Compression (ROHC) Framework; rfc4995. txt" , IETF Standard, Internet Engineering Task Force, IETF, CH, Jul. 1, 2007 (Jul. 1, 2007), XP015052529, ISSN: 0000-0003 abstract sections 1-4.
Overhead consideration on relay , 3GPP Draft; R2-093904 Overhead Consideration on Relay, 3rd Generation Partnership Project (3GPP), Mobile Competence Centre ; 650, Route Des Lucioles ; F-06921 Sophia-Antipolis Cedex ; France, No. Los Angeles, USA; Jun. 23, 2009, Jun. 23, 2009 (Jun. 23, 2009), XP050352099, [ retrieved on Jun. 23, 2009]the whole document.
Consideration on Relay, 3rd Generation Partnership Project (3GPP), Mobile Competence Centre ; 650 Route Des Lucioles ; F-06921 Sophia-Antipolis Cedex ; France, No. Los Angeles, USA; 20090623, Jun. 23, 2009 (Jun. 23, 2009), XP050352099, [ retriieved on Jun. 23, 2009]the whole document.
Email Discussion Rapporteur (NTT Docomo et al: 3GPP Draft; R2-093972, 3rd Generation Partnership Project (3GPP), Mobile Competence Centre ; 650, Route Des Lucioles ; F-06921 Sophia-Antipolis Cedex ; France, No. Los Angeles, USA; Jun. 23, 2009 (Jun. 23, 2009), XP050352150.
Taiwan Search Report—TW099127321—TIPO—Jul. 12, 2013.
Texas Instruments: "S1 termination options for Type I relays in LTE-A", 3GPP TSG RAN WG2 #66bis, R2-093786, Jun. 29, 2009, pp. 1-3.

* cited by examiner

ROBUST HEADER COMPRESSION FOR RELAY NODES

CLAIM OF PRIORITY UNDER 35 U.S.C. §119

The present Application for patent claims priority to Provisional Application No. 61/234,239 entitled "ROHC GTP PROFILE SPECIFICATION" filed Aug. 14, 2009, and assigned to the assignee hereof and hereby expressly incorporated by reference herein.

BACKGROUND

Field

The following description relates generally to wireless communications, and more particularly to routing packets among multiple access points.

Background

Wireless communication systems are widely deployed to provide various types of communication content such as, for example, voice, data, and so on. Typical wireless communication systems may be multiple-access systems capable of supporting communication with multiple users by sharing available system resources (e.g., bandwidth, transmit power, . . . ). Examples of such multiple-access systems may include code division multiple access (CDMA) systems, time division multiple access (TDMA) systems, frequency division multiple access (FDMA) systems, orthogonal frequency division multiple access (OFDMA) systems, and the like. Additionally, the systems can conform to specifications such as third generation partnership project (3GPP), 3GPP long term evolution (LTE), ultra mobile broadband (UMB), and/or multi-carrier wireless specifications such as evolution data optimized (EV-DO), one or more revisions thereof, etc.

Generally, wireless multiple-access communication systems may simultaneously support communication for multiple mobile devices. Each mobile device may communicate with one or more access points (e.g., base stations) via transmissions on forward and reverse links. The forward link (or downlink) refers to the communication link from access points to mobile devices, and the reverse link (or uplink) refers to the communication link from mobile devices to access points. Further, communications between mobile devices and access points may be established via single-input single-output (SISO) systems, multiple-input single-output (MISO) systems, multiple-input multiple-output (MIMO) systems, and so forth. Access points, however, can be limited in geographic coverage area as well as resources such that mobile devices near edges of coverage and/or devices in areas of high traffic can experience degraded quality of communications from an access point.

Robust header compression (RoHC) can be utilized to compress packet headers related to communications between mobile devices an access points to provide increased data throughput. Moreover, for example, relay nodes can be provided to expand network capacity and coverage area by facilitating communication between mobile devices and access points. For example, a relay node can establish a backhaul link with a donor access point, which can provide access to a number of other relay nodes, and the relay node can establish an access link with one or more mobile devices or additional relay nodes. Thus, there can be multiple relay nodes in a communications path between a mobile device and access point. In certain relay node configurations (e.g., for internet protocol (IP) relay nodes), each relay node can add one or more headers (e.g., a general packet radio service (GPRS) tunneling protocol (GTP) header) to a received packet to facilitate routing the received packet among the various relay nodes and/or among core network components.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In accordance with one or more aspects and corresponding disclosure thereof, various aspects are described in connection with facilitating providing a robust header compression (RoHC) profile for protocol headers related to routing a packet, such as a general packet radio service (GPRS) tunneling protocol (GTP) header and/or one or more header combinations including a GTP header. For example, upon receiving a packet comprising one or more GTP headers, an access point or other wireless device can compress the GTP header(s) according to a defined RoHC profile for compressing GTP headers. Similarly, upon receiving one or more compressed GTP headers, an access point or other wireless device can decompress the headers according to a RoHC profile defined for decompressing GTP headers.

According to related aspects, a method is provided that includes receiving a packet including one or more headers for routing the packet among various nodes of a wireless network and determining that at least one of the one or more headers is a compressible GTP header. The method also includes applying RoHC to the compressible GTP header according to a GTP RoHC profile.

Another aspect relates to a wireless communications apparatus. The wireless communications apparatus can include at least one processor configured to obtain a packet including one or more headers and determine a type of at least one of the one or more headers as a GTP header that is compressible. The at least one processor is further configured to compress the GTP header using RoHC according to a GTP RoHC profile. The wireless communications apparatus also comprises a memory coupled to the at least one processor.

Yet another aspect relates to an apparatus. The apparatus includes means for receiving a packet including one or more headers for routing the packet among various nodes of a wireless network and means for determining that at least one of the one or more headers is a compressible GTP header. The apparatus also includes means for applying RoHC to the compressible GTP header according to a GTP RoHC profile.

Still another aspect relates to a computer program product, which can have a computer-readable medium including code for causing at least one computer to obtain a packet including one or more headers and code for causing the at least one computer to determine a type of at least one of the one or more headers as a GTP header that is compressible. The computer-readable medium can also comprise code for causing the at least one computer to compress the GTP header using RoHC according to a GTP RoHC profile.

Moreover, an additional aspect relates to an apparatus including a receiving component that obtains a packet including one or more headers for routing the packet among various nodes of a wireless network and a RoHC profile selecting component that determines at least one of the one or more headers is a compressible GTP header and selects a GTP RoHC profile for compressing the GTP header. The apparatus can further include a RoHC applying component that utilizes robust header compression (RoHC) to compress the compressible GTP header according to the GTP RoHC profile.

According to another aspect, a method is provided that includes receiving a packet including one or more RoHC headers comprising a context identifier and determining a GTP RoHC profile for decompressing the one or more RoHC headers based at least in part on the context identifier. The method also includes applying RoHC to the one or more RoHC headers to decompress the RoHC headers to corresponding GTP headers according to the GTP RoHC profile.

Another aspect relates to a wireless communications apparatus. The wireless communications apparatus can include at least one processor configured to obtain a packet including one or more RoHC headers comprising a context identifier and determine a GTP RoHC profile for decompressing the one or more RoHC headers based on the context identifier. The at least one processor is further configured to decompress the one or more RoHC headers using RoHC according to the GTP RoHC profile. The wireless communications apparatus also comprises a memory coupled to the at least one processor.

Yet another aspect relates to an apparatus. The apparatus includes means for receiving a packet including one or more RoHC headers comprising a context identifier and means for selecting a GTP RoHC profile for decompressing the one or more RoHC headers based on the context identifier. The apparatus also includes means for applying RoHC to the one or more RoHC headers to decompress the one or more RoHC headers to corresponding GTP headers according to the GTP RoHC profile.

Still another aspect relates to a computer program product, which can have a computer-readable medium including code for causing at least one computer to obtain a packet including one or more RoHC headers comprising a context identifier and code for causing the at least one computer to determine a GTP RoHC profile for decompressing the one or more RoHC headers. The computer-readable medium can also comprise code for causing the at least one computer to decompress the one or more RoHC headers using RoHC according to the GTP RoHC profile.

Moreover, an additional aspect relates to an apparatus including a receiving component that obtains a packet including one or more RoHC headers comprising a context identifier and a protocol type and a RoHC profile determining component that discerns the protocol type is GTP and selects a GTP RoHC profile for decompressing the one or more RoHC headers. The apparatus can further include a RoHC applying component that utilizes RoHC to decompress the one or more RoHC headers to corresponding GTP headers according to the GTP RoHC profile.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed and this description is intended to include all such aspects and their equivalents.

DETAILED DESCRIPTION

Figure 1:
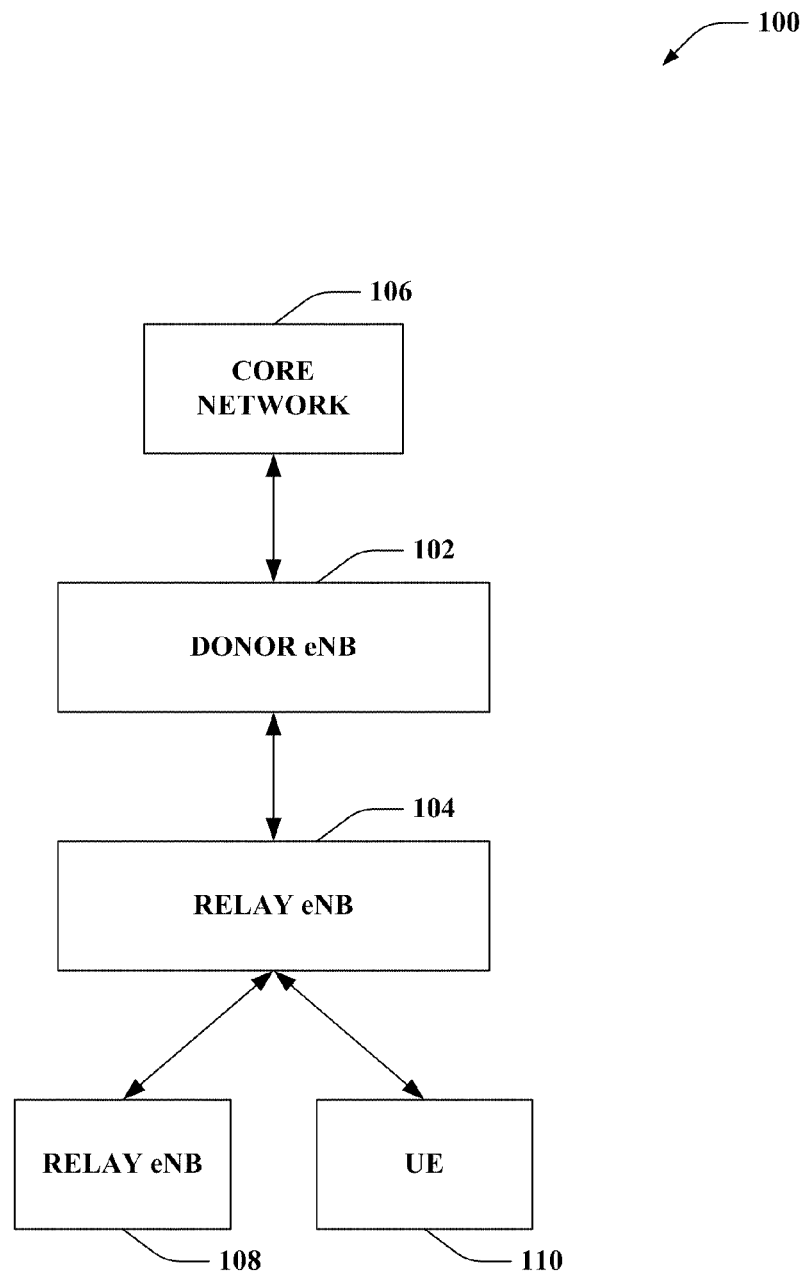
FIG. 1 is an illustration of an example wireless communications system that facilitates providing relays for wireless networks.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a terminal, which can be a wired terminal or a wireless terminal. A terminal can also be called a system, device, subscriber unit, subscriber station, mobile station, mobile, mobile device, remote station, remote terminal, access terminal, user terminal, terminal, communication device, user agent, user device, or user equipment (UE). A wireless terminal may be a cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem. Moreover, various aspects are described herein in connection with a base station. A base station may be utilized for communicating with wireless terminal(s) and may also be referred to as an access point, a Node B, evolved Node B (eNB), or some other terminology.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband-CDMA (W-CDMA) and other variants of CDMA. Further, cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, cdma2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

Referring to FIG. 1, a wireless communication system 100 is illustrated that facilitates providing relay functionality in wireless networks. System 100 includes a donor eNB 102 that provides one or more relay eNBs, such as relay eNB 104, with access to a core network 106. Similarly, relay eNB 104 can provide one or more disparate relay eNBs, such as relay eNB 108, or UEs, such as UE 110, with access to the core network 106 via donor eNB 102. Donor eNB 102, which can also be referred to as a cluster eNB, can communicate with the core network 106 over a wired or wireless backhaul link, which can be an LTE or other technology backhaul link. In one example, the core network 106 can be a 3GPP LTE or similar technology network.

Donor eNB 102 can additionally provide an access link for relay eNB 104, which can also be wired or wireless, LTE or other technologies, and the relay eNB 104 can communicate with the donor eNB 102 using a backhaul link over the access link of the donor eNB 102. Relay eNB 104 can similarly provide an access link for relay eNB 108 and/or UE 110, which can be a wired or wireless LTE or other technology link. In one example, donor eNB 102 can provide an LTE access link, to which relay eNB 104 can connect using an LTE backhaul, and relay eNB 104 can provide an LTE access link to relay eNB 108 and/or UE 110. Donor eNB 102 can connect to the core network 106 over a disparate backhaul link technology. Relay eNB 108 and/or UE 110 can connect to the relay eNB 104 using the LTE access link to receive access to core network 106, as described. A donor eNB and connected relay eNBs can be collectively referred to herein as a cluster.

According to an example, relay eNB 104 can connect to a donor eNB 102 at the link layer (e.g., media access control (MAC) layer), transport layer, application layer, and/or the like, as would a UE in conventional LTE configurations. In this regard, donor eNB 102 can act as a conventional LTE eNB requiring no changes at the link layer, transport layer, application layer, etc, or related interface (e.g., user-to-user (Uu), such as E-UTRA-Uu, user-to-network (Un), such as EUTRA-Un, etc.), to support the relay eNB 104. In addition, relay eNB 104 can appear to UE 110 as a conventional eNB in LTE configurations at the link layer, transport layer, application layer, and/or the like, such that no changes are required for UE 110 to connect to relay eNB 104 at the link layer, transport layer, application layer, etc., for example. In addition, relay eNB 104 can configure procedures for resource partitioning between access and backhaul link, interference management, idle mode cell selection for a cluster, and/or the like. It is to be appreciated that relay eNB 104 can connect to additional donor eNBs, in one example.

Thus, for example, relay eNB 104 can establish a connection with donor eNB 102 to receive access to one or more components in core network 106 (such as a mobility management entity (MME), serving gateway (SGW), packet data network (PDN) gateway (PGW), etc.). In an example, relay eNB 104 can obtain an internet protocol (IP) address from a PGW/SGW in the core network 106 (e.g., via donor eNB 102) for communicating therewith. In addition, UE 110 can establish a connection with relay eNB 104 to receive access to one or more similar components in core network 106. In this regard, for example, UE 110 can communicate IP packets to relay eNB 104 for providing to core network 106. Relay eNB 104 can obtain the IP packets, associate one or more additional headers with the packets related to relay eNB 104, and provide the packets to donor eNB 102. The additional headers can include an IP or user datagram protocol (UDP)/IP header related to relay eNB 104 and a corresponding component of core network 106, a general packet radio service (GPRS) tunneling protocol (GTP) header or similar header to facilitate routing of the packet to the component of core network 106 and/or routing of a responding packet to relay eNB 104, etc. Thus, donor eNB 102 can route the packets to a component of core network 106 related to relay eNB 104 (e.g., by adding another header and transmitting to core network 106).

Components of core network 106, for example, can route the packets within the core network 106 according to the various IP headers. Moreover, for example, core network 106 can construct packets for providing to UE 110 to include UDP/IP headers, GTP headers, etc., related to routing the packet to UE 110 through relay eNB 104. In an example, core network 106 can include an IP header related to UE 110 with the packet, as well as a UDP/IP and/or GTP header related to relay eNB 104, and/or similar header(s) related to donor eNB 102. Core network 106 can forward the packet with the headers to donor eNB 102. Donor eNB 102 can obtain the packet, remove the UDP/IP and/or GTP header related to donor eNB 102, and forward the packet to relay eNB 104 based on the next GTP header. Relay eNB 104 can similarly remove the header(s) related to relay eNB 104, in one example, and relay eNB 104 can forward the packet to UE 110 based on the remaining IP header or another header. Though one relay eNB 104 is shown between UE 110 and donor eNB 102, it is to be appreciated that additional relay eNBs can exist, and UDP/IP and/or GTP headers can be added to uplink and downlink packets, as described, for each relay eNB to facilitate packet routing. In this regard, the packets can relate to a communications path or flow among components of the wireless network.

The additional headers, for example, can introduce overhead when transmitting packets over a radio interface (e.g., between donor eNB 102 and relay eNB 104, relay eNB 104 and relay eNB 108, etc.). In this regard, donor eNB 102 can compress GTP and/or corresponding UDP/IP headers related to relay eNB 104 and/or one or more relay eNBs using robust header compression (RoHC). RoHC can refer to a state-based header compression algorithm that can be utilized between multiple nodes of a wireless network. RoHC can be utilized to compress and/or decompress packet headers according to defined RoHC profiles, and thus, donor eNB 102 can utilize a profile for applying RoHC to the GTP and/or UDP/IP headers. Currently, RoHC version 1 (v1) and RoHC version 2 (v2) can be utilized for applying RoHC. In the case of multiple GTP and/or UDP/IP headers, for example, donor eNB 102 can recursively apply RoHC (e.g., RoHC v1) according to a RoHC profile for a single GTP and/or UDP/IP header. In another example, the donor eNB 102 can apply a single instance of RoHC v2 for compressing or decompressing one or more GTP and/or UDP/IP headers.

Figure 2:
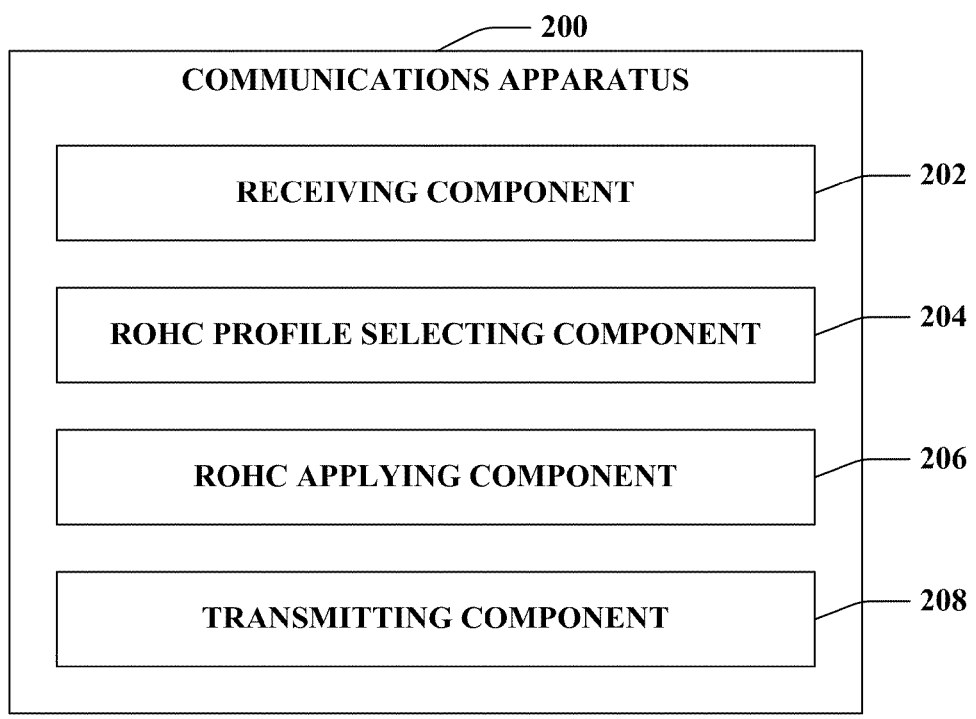
FIG. 2 is an illustration of an example communications apparatus for employment within a wireless communications environment.

Turning now to FIG. 2, a communications apparatus 200 that can participate in a wireless communications network is illustrated. The communications apparatus 200 can be a mobile device, access point, relay node, a portion thereof, or substantially any device that communicates in a wireless network. Communications apparatus 200 can comprise a receiving component 202 that obtains a packet from one or more disparate communications apparatuses and a RoHC profile selecting component 204 that determines a RoHC profile for compressing or decompressing one or more headers of the packet and/or one or more headers generated for the packet. Communications apparatus 200 also includes a RoHC applying component 206 that can compress or decompress the headers according to the RoHC profile and a transmitting component 208 that transmits the headers, once compressed or decompressed, to the one or more disparate communications apparatuses.

According to an example, receiving component 202 can obtain a packet that includes one or more headers for routing the packet among one or more nodes. The packet can be obtained from a disparate communications apparatus, which can be an access point, mobile device, core network component, and/or the like, for example. In another example, the packet can be at least partially generated by communications apparatus 200. In one example, communications apparatus 200 can add one or more headers to the packet to facilitate routing the packet as well. As described, for example, the one or more headers can include GTP headers (e.g., GTP-U headers, such as combination IP-UDP-GTP headers) and/or similar headers. In one example, the GTP header can encapsulate a baseheader, such as an IP header, real-time transport protocol (RTP) header (e.g., a combination IP-UDP-RTP header), or similar header, which can be an innermost header of the packet. In addition, for example, a packet can include multiple GTP headers that each can relate to an access point or relay node in a communications path or flow for the packet. In any case, RoHC profile selecting component 204 can determine one or more RoHC profiles to apply for compressing or decompressing the multiple headers, baseheader, etc.

In one example, RoHC profile selecting component 204 can determine whether there is a RoHC context established for the packet. This can include, for example, determining whether there is a RoHC context related to a flow over which the packet is received. If so, RoHC applying component 206 can compress or decompress the packet headers according to the RoHC context. Where there is not yet an established RoHC context, RoHC profile selecting component 204 can select a RoHC profile for compressing or decompressing headers received over the flow, and in one example, can store the RoHC profile as part of a RoHC context for the flow. Where the packet includes uncompressed headers, for example, RoHC profile selecting component 204 can determine a RoHC profile for compressing one or more of the headers. Where the packet includes compressed headers, for example, RoHC profile selecting component 204 can determine a RoHC profile for decompressing one or more of the compressed headers.

For example, as described, RoHC profile selecting component 204 can utilize a switch or other condition based mechanism for determining a RoHC profile to apply to one or more headers of the packet to compress the headers relating to the RoHC context. In one example, RoHC profile selecting component 204 can determine that one or more headers in the packet relate to a compressible GTP header based at least in part on verifying one or more conditions. For example, if the packet is an IP packet, includes a protocol number in IPv4 header or next header value in IPv6 header (which indicates UDP transport), the UDP destination port number is 2152 (which indicates GTPv1 protocol), GTP header's protocol type is 1 (which indicates GTP), and GTP-U message type is 255 (which indicates a GTP PDU (G-PDU) payload), RoHC profile selecting component 204 can determine that the header is a compressible GTP header.

Moreover, for example, RoHC profile selecting component 204 can verify one or more flags of the GTP header before selecting the GTP RoHC compression profile for the GTP header. In this example, a flag (e.g., E flag) can be verified to determine whether extension headers are present (e.g., UDP port extension header, packet data convergence protocol (PDCP) protocol data unit (PDU) number header, etc.). If no such headers exist (e.g., the flag is 0 or false), RoHC profile selecting component 204 can determine that the GTP header is compressible. For example, this can avoid the case of handover to ease complexity where a PDCP PDU number may be present in the packet.

Similarly, RoHC profile selecting component 204 can verify a flag (e.g., PN flag) related to whether one or more optional fields are present (e.g., sequence number, NPDU number, next header type, etc.). Again, if no such fields are present, in one example, RoHC profile selecting component 204 can determine that the GTP header is compressible. Thus, in one example, where the optional fields are present, RoHC profile selecting component 204 can determine to not select a RoHC profile to ease complexity. It is to be appreciated that in both cases, packets including optional fields or extension headers can be relatively rare. Thus, in one example, it can be more efficient to exclude code to compress and decompress the headers including the optional fields or extension headers. In another example, however, the GTP RoHC compression profile can process the extension headers and/or optional fields.

Where RoHC profile selecting component 204 determines that the header is a compressible GTP header, for example, it selects a GTP RoHC profile for compressing the GTP header, and RoHC applying component 206 can compress the header using the GTP RoHC profile. For example, RoHC applying component 206 can compress the header at least in part by removing at least a portion of the GTP header and inserting a RoHC header to the packet with a context identifier, a RoHC profile type identifier, and/or the like. For example, RoHC applying component 206 can select a context identifier for the RoHC header for compressing the headers of the packet where a related RoHC context is not yet initialized. In another example, RoHC applying component 206 can determine whether there is a related RoHC context established for the packet based at least in part on one or more parameters of the packet. If so, RoHC applying component 206, for example, generates a RoHC compressed header at least in part by applying RoHC compression to the headers of the packet according to the RoHC context.

Transmitting component 208 can transmit the packet with the RoHC compressed headers and related RoHC header to a disparate communications apparatus. Based at least in part on the context identifier, RoHC profile type identifier, etc., for example, the disparate communications apparatus can decompress the compressed header using RoHC. In one example, RoHC applying component 206 can at least compress static values of one or more GTP headers according to the GTP RoHC profile. In another example, RoHC applying component 206 can also compress one or more non-static values according to one or more auxiliary encoding functions. For example, a GTP header can have a length of 36-44 bytes, excluding possible extension headers. After compressing with RoHC applying component 206 according to the GTP RoHC profile, the header can be 0-5 bytes, depending on the compression format, plus 1-3 bytes for the RoHC header. Thus, compressing GTP headers can mitigate significant overhead, especially in the case of voice over IP (VoIP) packets, which have relatively small payload and need to be transmitted at a relatively high rate.

In an example, the RoHC profile for GTP headers can include one or more header formats. For example, a GTP header can include the following fields.

| Field | Length | Presence | Value Class |
| --- | --- | --- | --- |
| Version | 3 | Mandatory | STATIC-KNOWN |
| PT | 1 | Mandatory | STATIC-KNOWN |
| RESERVED | 1 | Mandatory | STATIC-KNOWN |
| E | 1 | Mandatory | STATIC-KNOWN |
| S | 1 | Mandatory | STATIC-DEF |
| PN | 1 | Mandatory | STATIC-KNOWN |
| MessageType | 8 | Mandatory | STATIC-KNOWN |
| Length | 16 | Mandatory | INFERRED |
| TEID | 32 | Mandatory | STATIC-DEF |
| SequenceNumber | 16 | Optional | IRREGULAR/PATTERN |
| N-PDU Number | 8 | Optional | IRREGULAR |
| Next Ext Header Type | 8 | Optional | IRREGULAR |
| GTP-U Ext Header | 0 | NOT PRESENT | STATIC-KNOWN | where PT is protocol type, E is the extension flag, S is the sequence number flag, PN is the optional field flag, and Next Ext Header Type is a type of a next extension header. The value class as specified can relate to a status of the related field for a given flow. For example, STATIC-KNOWN can indicate that the field does not change across flows, STATIC-DEF can indicate that the field is static for a given flow, but may be different in another flow, IRREGULAR can indicate that the field changes even in a given flow per packet, etc. In addition, PATTERN can indicate that fields change in a given flow per packet, but the change can be predicted (e.g., such as a sequence number that is incremented for each packet), and INFERRED can indicate that the field can be calculated based on one or more other fields (e.g., in the header or a different header).

Thus, for example, the following header formats can be utilized to define header compression for GTP headers in RoHC (e.g., using RoHC v2 profile formal notation).

In this example, inferred_gtpu_length can relate to an auxiliary encoding/decoding function that can determine the Length field of the GTP header, and thus RoHC applying component 206 can exclude the Length field to further compress the GTP header. In this example, the Length field can be computed as the sum of an optional UDP header length and a transport PDU (T-PDU) length at the transport layer. Moreover, in this example, RoHC applying component 206 can ensure that the UDP header length is consistent with the Length field of preceding subheaders when determining whether to compress the Length field (e.g., that there is no padding after the UDP payload covered by the IP length). Similarly, inferred_udp_checksum allows RoHC applying component 206 to exclude the checksum value from the IPv4 header portion of the GTP header.

Moreover, for example, RoHC applying component 206 can utilize gtpu( ) or compressing multiple GTP headers in RoHC v2 or a single GTP header in RoHC v1. Where RoHC applying component 206 compresses a single IP-UDP-GTP header in RoHC v1, which can encapsulate a baseheader (e.g., an IP-UDP-RTP header), as described, the UDP-GTP chain of the outer GTP header can be the IP extension header of the Outer IP header fields in Extension Format 3. Thus, RoHC applying component 206 can set the IP extension header to the UDP-GTP chains in the_irregular suffix format, as defined in gtpu( ) indicated in the formal notation above. Moreover, where RoHC applying component 206 compresses multiple GTP headers in RoHC v2, optional fields can be added or removed for a given flow, and thus, RoHC applying component 206 can refresh a RoHC context by determining not to apply RoHC (e.g., based at least in part on detecting addition or removal of a field), and transmitting component 208 can send initialization and refresh packets to the disparate communications apparatus in addition to or instead of the packets with compressed headers.

In addition, as shown above, RoHC applying component 206 can generate a message sequence number (MSN) for the packet based at least in part on a sequence number from the GTP header (if present). Where the sequence number is not present in the GTP header, RoHC applying component 206 can generate a random starting number and assign subsequent sequential numbers to subsequent packets of a related RoHC context, as described. In another example, described in further detail below, gtpu_baseheader( ) can additionally be utilized when recursively compressing headers in RoHC v1 to compress a baseheader, while gtpu( ) can be used for the multiple GTP headers in the packet.

In another example, receiving component 202 can obtain a packet including one or more compressed GTP headers. In this example, RoHC profile selecting component 204 can determine a RoHC profile for decompressing the headers based at least in part on one or more parameters in a RoHC header of the packet. The RoHC header can include a context identifier and a RoHC profile identifier, as described. Based at least in part on the RoHC profile identifier, RoHC profile selecting component 204 can determine to utilize a GTP RoHC profile to decompress one or more headers in the packet. RoHC applying component 206 can apply the GTP RoHC profile to decompress one or more GTP headers (e.g., based at least in part on a similar formal notation, as provided above). In addition, RoHC applying component 206 can decompress a baseheader (e.g., using a different RoHC profile in RoHC v1 or the same RoHC profile in RoHC v2). In either case, transmitting component 208 can transmit the packets with decompressed headers to a disparate communications apparatus.

In yet another example, there can be an extension header in the GTP header. In this case, the following header formats can be utilized to define header compression for GTP extension headers in RoHC (e.g., using RoHC v2 profile formal notation).

```
gtpu_extension(header_type) {
    UNCOMPRESSED {
        gtpu_ext_length              =:=
        uncompressed(8,0x01)         [ 8 ];
            gtpu_ext_pdcpnumber
                [ 16 ];
            gtpu_ext_nextheader      =:=  uncompressed(8,0)
                [ 8 ];
            // Allows no more than 1 GTP-U Extension header
    }
    DEFAULT {
            // Header type is from the Next Extension Header
            // Type field of the optional GTP-U header, when
            // gtpu_flag_eh is set.
            ENFORCE( header_type == 0b11000000 );
    }
    COMPRESSED gtpu_ext_static {
    }
    COMPRESSED      gtpu_ext_dynamic {
        gtpu_ext_pdcpnumber          =:=  irregular(16)
            [ 16 ];
    }
    COMPRESSED      gtpu_ext_irregular {
        gtpu_ext_pdcpnumber          =:=  irregular(16)
            [ 16 ];
    }
}
```

Figure 3:
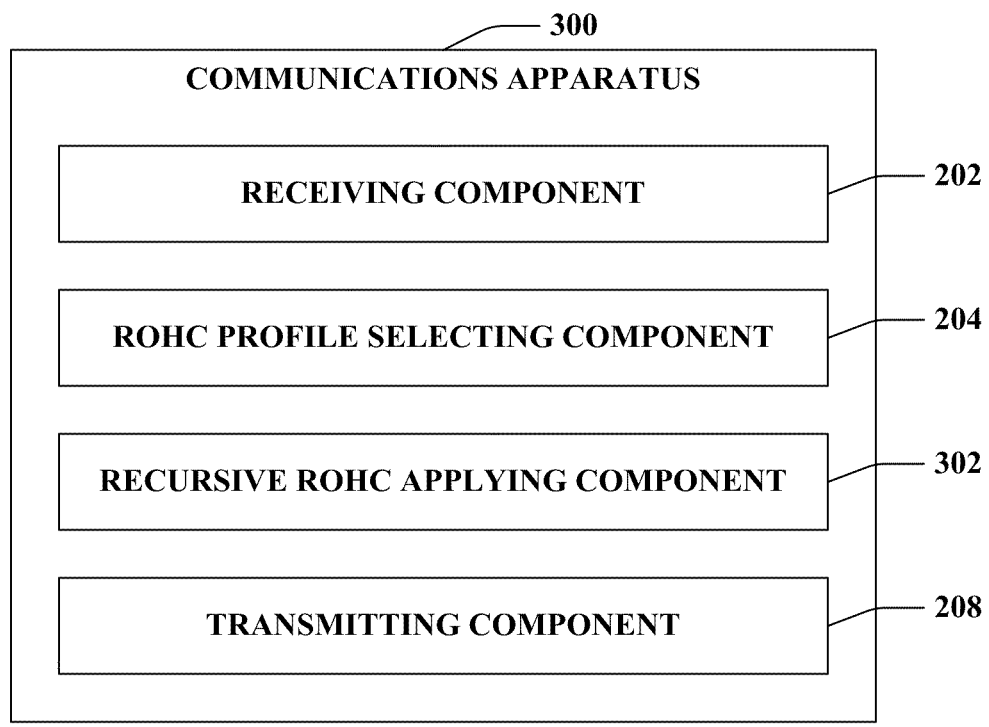
FIG. 3 is an illustration of an example communications apparatus for recursively applying robust header compression (RoHC).

Referring to FIG. 3, a communications apparatus 300 that can participate in a wireless communications network is illustrated. The communications apparatus 300 can be a mobile device, access point, relay node, a portion thereof, or substantially any device that communicates in a wireless network. Communications apparatus 300 can comprise a receiving component 202 that obtains a packet from one or more disparate communications apparatuses and a RoHC profile selecting component 204 that determines a RoHC profile for compressing or decompressing one or more headers of the packet and/or one or more headers generated for the packet. Communications apparatus 300 can comprise a recursive RoHC applying component 302 that can recursively compress or decompress the headers according to the RoHC profile and a transmitting component 208 that transmits the headers as compressed or decompressed to the one or more disparate communications apparatuses.

According to an example, receiving component 202 can obtain a packet that includes one or more headers for routing the packet among one or more nodes. The packet can be obtained from a disparate communications apparatus, which can be an access point, mobile device, core network component, and/or the like, for example. In another example, the packet can be at least partially generated by communications apparatus 300. In one example, communications apparatus 300 can add one or more headers to the packet to facilitate routing the packet as well. As described, for example, the one or more headers can include GTP headers (e.g., GTP-U headers, such as combination IP-UDP-GTP headers) and/or similar headers. In one example, a GTP header can encapsulate a baseheader, such as an IP header, real-time transport protocol (RTP) header (e.g., a combination IP-UDP-RTP header), or similar header, which can be an innermost header of the packet. In addition, for example, a packet can include multiple GTP headers that each can relate to an access point or relay node in a communications path for the packet. In any case, RoHC profile selecting component 204 can determine one or more RoHC profiles to apply for compressing or decompressing the multiple headers, baseheader, etc.

As described, RoHC profile selecting component 204 can select a RoHC profile according to a RoHC context where a RoHC context is established for the packet (e.g., for a flow over which the packet is received). If not, RoHC profile selecting component 204 can select a RoHC profile for the GTP headers, and store the RoHC profile or an indicator thereof in a context for the packet. Where the packet includes uncompressed headers, for example, RoHC profile selecting component 204 can determine a profile for compressing at least one of the plurality of headers. Where the packet includes compressed headers, for example, RoHC profile selecting component 204 can determine a profile for decompressing at least one of the plurality of compressed headers.

For example, as described, RoHC profile selecting component 204 can utilize a switch or other condition based mechanism, as described, for determining a RoHC profile to apply to one or more headers of the packet to compress the headers. In one example, RoHC profile selecting component 204 can determine that an outermost header of the packet is a GTP header, and can select a RoHC profile for compressing GTP headers, as described above. Recursive RoHC applying component 302 can compress the GTP header according to the GTP RoHC profile in RoHC v1. In this example, RoHC profile selecting component 204 can then determine a RoHC profile for a next outermost header of the packet. For example, this header can be GTP as well, RoHC profile selecting component 204 can determine a GTP RoHC profile, and recursive RoHC applying component 302 can apply the RoHC profile to compress the header, and so on until all headers (or a desired portion of the headers) of the packet are compressed. Thus, for example, the headers of the packet can appear as a plurality of compressed RoHC packets.

In this regard, for example, a packet compressed by recursive RoHC applying component 302 can have a RoHC header for each compressed header. In addition, for example, it is to be appreciated that recursive RoHC applying component 302 can compress the multiple headers starting with an innermost header, starting with a random header, and/or the like, and can perform compressions serially or in parallel. In addition, as described, RoHC profile selecting component 204 can determine a RoHC profile for a baseheader encapsulated by one or more of the GTP headers, and recursive RoHC applying component 302 can compress the baseheader according to the determined RoHC profile. Transmitting component 208 can transmit the packet with compressed headers to a disparate communications apparatus, as described. Similarly, receiving component 202 can obtain a packet with a plurality of compressed headers, RoHC profile selecting component 204 can determine RoHC profiles for the compressed headers (e.g., which can include GTP RoHC profiles and can be based on a context identifier or otherwise), and recursive RoHC applying component 302 can apply the RoHC profiles to each of the compressed headers to decompress the headers. Transmitting component 208, in this example, can transmit the packet with decompressed headers to the disparate communications apparatus.

Figure 4:
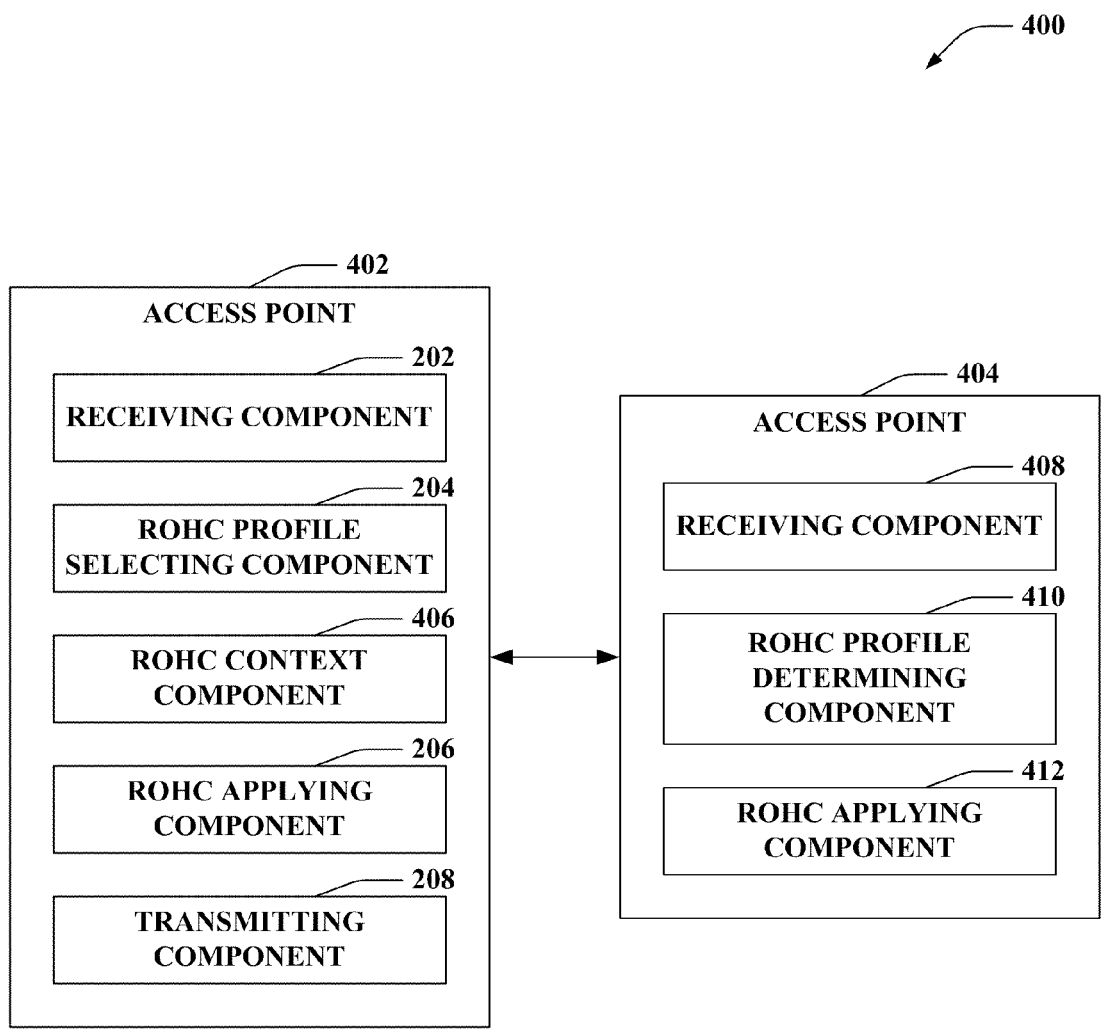
FIG. 4 is an illustration of an example wireless communications system that facilitates compressing and decompressing general packet radio service (GPRS) tunneling protocol (GTP) headers according to a GTP RoHC profile.

Referring to FIG. 4, an example wireless communication system 400 for compressing and decompressing GTP headers is illustrated. System 400 includes access points 402 and 404 that provide wireless network access to one or more devices or disparate access points, as described. In addition, it is to be appreciated that access point 402 can comprise components of access point 404, and vice versa, to provide similar functionality, in one example. Moreover, access points 402 and 404 can each be a macrocell access point, femtocell access point, picocell access point, mobile base station, and/or the like, which can provide donor access point and/or relay node functionality, as described above.

Access point 402 can comprise a receiving component 202 that obtains a packet from one or more wireless devices or access points and a RoHC profile selecting component 204 that determines a RoHC profile for compressing or decompressing one or more headers of the packet and/or one or more headers generated for the packet. Access point 402 also comprises a RoHC context component 406 that associates a RoHC context to packets received over a flow, a RoHC applying component 206 that can compress the headers according to the RoHC profile, and a transmitting component 208 that transmits the headers, once compressed, to one or more disparate access points. Access point 404 can comprise a receiving component 408 that obtains packets with one or more RoHC compressed headers from an access point, a RoHC profile determining component 410 that discerns a RoHC profile for decompressing the one or more RoHC headers, and a RoHC applying component 412 that decompresses the one or more RoHC headers according to the RoHC profile.

According to an example, receiving component 202 can obtain a packet with one or more GTP headers, as described. RoHC profile selecting component 204 can determine whether there is a RoHC context related to the packet (e.g., related to a flow over which the packet is received). If so, RoHC profile selecting component 204 can determine a RoHC profile to apply to compress the one or more GTP headers based at least in part on the RoHC context, as described. If not, however, RoHC profile selecting component 204 can determine a RoHC profile for the one or more GTP headers based at least in part on one or more aspects of the one or more GTP headers, as described above (e.g., IP protocol type, protocol number, UDP destination port, presence of extended header or optional fields flag, etc.). In addition, where a RoHC context does not yet exist for the packet (e.g., as related to the flow), RoHC context component 406 can generate a RoHC context that includes a context identifier, the selected RoHC profile type, and/or additional metrics for applying RoHC to compress and/or decompress headers related to the packet. In this example, RoHC profile selecting component 204 can determine a GTP RoHC profile for the GTP headers.

In addition, for example, RoHC context component 406 can communicate the RoHC context, context identifier, RoHC profile type, and/or related parameters to access point 404 for subsequently decompressing packets compressed by access point 402 according to the RoHC context. Receiving component 408 can obtain the context, parameters, etc., and RoHC applying component 412 can store the context, parameters, etc. for decompressing headers of packets from access point 402. In one example, the parameters can include fields that will be subsequently compressed by RoHC applying component 206 in related headers of subsequent packets (e.g., static fields, non-static fields that can be inferred or computed, non-static fields that can be partially compressed, and/or the like, as described). Moreover, in this example, RoHC applying component 206 can compress the one or more GTP headers according to the selected RoHC profile (e.g., GTP RoHC profile), as described, and transmitting component 208 can communicate the packet with one or more RoHC compressed headers to access point 404 and/or one or more other access points.

For example, receiving component 408 can obtain the packet including one or more RoHC compressed headers. As described, the RoHC compressed headers can include a RoHC header with a context identifier, a RoHC profile type, and/or one or more parameters for decompressing the headers. RoHC profile determining component 410 can discern a RoHC profile for decompressing the headers based at least in part on the indicated RoHC profile type. In this example, the RoHC profile type can be GTP in one or more of the RoHC headers. Thus, RoHC applying component 412 can decompress the one or more RoHC headers into GTP headers according to the context identifier and/or one or more parameters in the RoHC header. For example, based at least in part on the context identifier, RoHC applying component 412 can determine a RoHC context related to the corresponding RoHC header, and RoHC applying component 412 can decompress the RoHC header based at least in part on the RoHC context (e.g., one or more parameters in the RoHC context as received from access point 402, such as one or more static fields related to the context identifier, non-static inferred fields, etc.). In another example, RoHC profile determining component 410 can discern the RoHC profile based at least in part on the RoHC context indicated by the context identifier. RoHC applying component 206, for example, can generate a GTP header based on the one or more parameters and/or additional parameters in the RoHC header (such as non-static fields that cannot be inferred, computed, or partially compressed).

In addition, for example, RoHC profile selecting component 204 can determine a RoHC profile for one or more baseheaders encapsulated by a GTP header (e.g., based on a determined RoHC context or otherwise). Similarly, RoHC context component 406 can create a RoHC context where one does not exist for the packet. RoHC applying component 206 can compress the baseheader based on the RoHC profile. Upon receiving the packet with the compressed GTP headers and the compressed baseheader, RoHC profile determining component 410, in one example, can further determine a RoHC profile for decompressing the baseheader (e.g., based on a RoHC context related to the context identifier, a RoHC profile indicated in the RoHC header for the baseheader, etc.). It is to be appreciated that where RoHC v2 is used or RoHC v1 with a single GTP header, the baseheader can be decompressed with the GTP header. Where RoHC v1 is used to recursively compress and decompress the headers, however, the baseheader can be separately decompressed. In this example, RoHC profile determining component 410 can discern the RoHC profile related to the baseheader, as described above, and RoHC applying component 412 can apply the RoHC profile related to the baseheader to the baseheader for decompression.

Figure 5:
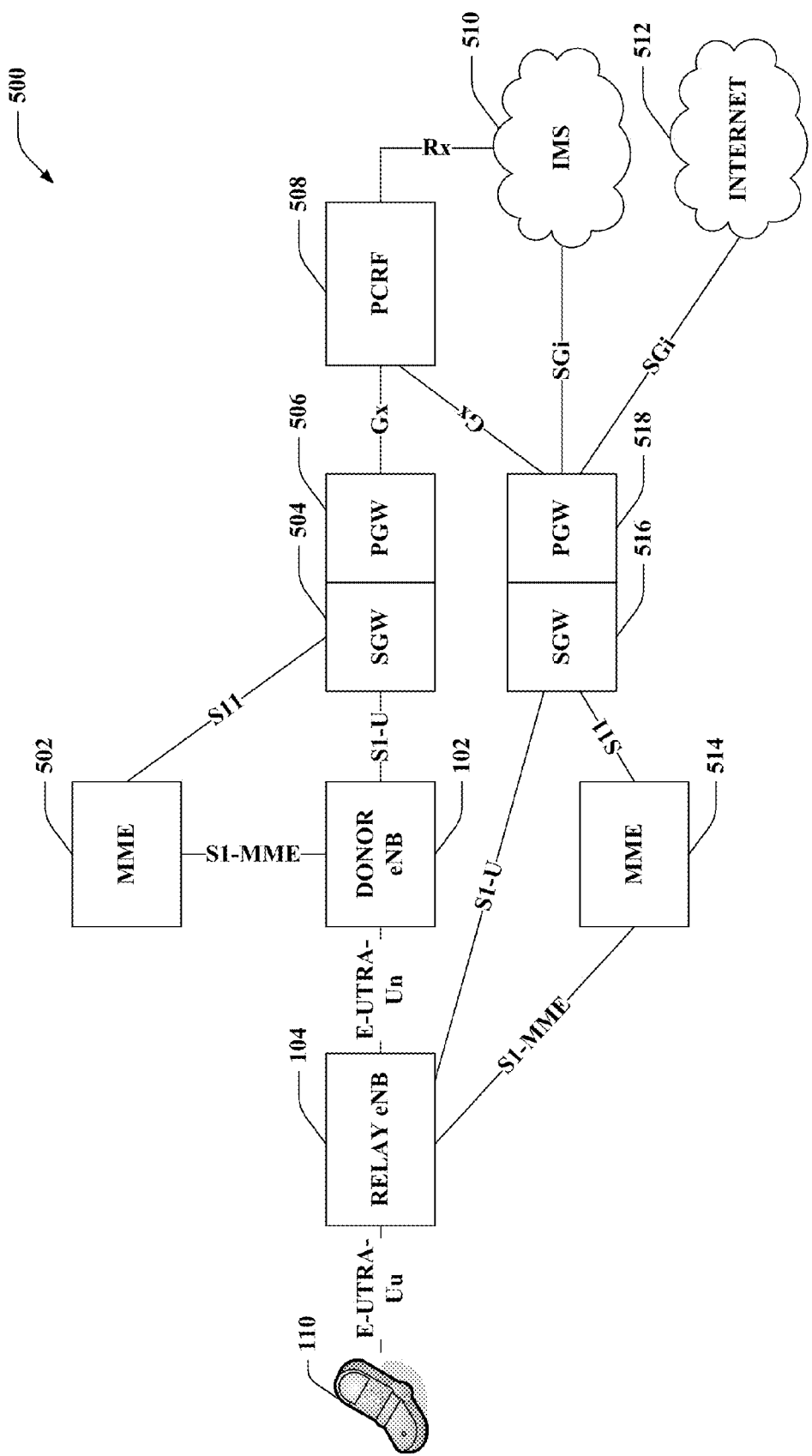
FIG. 5 is an illustration of an example wireless communications system that utilizes IP relays to provide access to a wireless network.

Now turning to FIG. 5, an example wireless communication network 500 that provides IP relay functionality is depicted. Network 500 includes a UE 110 that communicates with a relay eNB 104, as described, to receive access to a wireless network. Relay eNB 104 can communicate with a donor eNB 102 to provide access to a wireless network, and as described, donor eNB 102 can communicate with an MME 502 and/or SGW 504 that relate to the relay eNB 104. SGW 504 can connect to or be coupled with a PGW 506, which provides network access to SGW 504 and/or additional SGWs. PGW 506 can communicate with a policy and charging rules function (PCRF) 508 to authenticate/authorize relay eNB 104 to use the network, which can utilize an IP multimedia subsystem (IMS) 510 to provide addressing to the relay eNB 104.

According to an example, SGW 504 and PGW 506 can also communicate with SGW 516 and PGW 518, which can be related to UE 110. For example, SGW 516 and/or PGW 518 can assign an IP address to UE 110 and can communicate therewith via SGW 504 and PGW 506, donor eNB 102, and relay eNB 104. Communications between UE 110 and SGW 516 and/or PGW 518 can be tunneled through the nodes. SGW 504 and PGW 506 can similarly tunnel communications between UE 110 and MME 514. PGW 518 can similarly communicate with a PCRF 508 to authenticate/authorize UE 110, which can communicate with an IMS 510. In addition, PGW 518 can communicate directly with the IMS 510 and/or internet 512.

In an example, UE 110 can communicate with the relay eNB 104 over one or more radio protocol interfaces, such as an E-UTRA-Uu interface, as described, and the relay eNB 104 can communicate with the donor eNB 102 using one or more radio protocol interfaces, such as an E-UTRA-Un or other interface. As described, relay eNB 104 can add a UDP/IP and/or GTP header related to SGW 504 and/or PGW 506 to packets received from UE 110. Moreover, relay eNB 104 can compress the UDP/IP and GTP headers using a GTP RoHC profile, as described herein, and can forward the packets to donor eNB 102. Donor eNB 102 communicates with the MME 502 using an S1-MME interface and the SGW 504 and PGW 506 over an S1-U interface, as depicted. For example, donor eNB 102 can decompress the packets according a GTP RoHC profile or communicated RoHC context, as described, and can similarly add an UDP/IP and/or GTP header to the packets and forward to MME 502 or SGW 504.

SGW 504 and/or PGW 506 can utilize the UDP/IP and/or GTP headers to route the packets within the core network. For example, as described, SGW 504 and/or PGW 506 can receive the packets and remove the outer UDP/IP and/or GTP header, which relates to the SGW 504 and/or PGW 506. SGW 504 and/or PGW 506 can process the next UDP/IP and/or GTP header to determine a next node to receive the packets, which can be SGW 516 and/or PGW 518, which relate to UE 110. Similarly, SGW 516 and/or PGW 518 can obtain downlink packets related to UE and can include an UDP/IP header and/or GTP header related to communicating the packets to relay eNB 104 for providing to UE 110. SGW 516 and/or PGW 518 can forward the packets to SGW 504 and/or PGW 506, which relate to relay eNB 104. SGW 504 and/or PGW 506 can further include an additional UDP/IP and/or GTP header in the packets related to donor eNB 102.

SGW 504 and/or PGW 506 can communicate the packets to donor eNB 102 over a tunnel (e.g., by including one or more parameters in the GTP header included by SGW 504 and/or PGW 506). Donor eNB 102 can remove the outer GTP and/or UDP/IP header included by SGW 504 and/or PGW 506 and can determine a next node to receive the packets. Donor eNB 102 can compress the packets using RoHC for GTP, as described, and can transmit the packets to relay eNB 104 over a radio bearer related to a GTP tunnel Relay eNB 104 can receive the packets and can decompress the headers according to a RoHC context or related profile, as described. Relay eNB 104 can also determine a next node to receive the packets and/or a bearer over which to transmit the packets based at least in part on one or more parameters in the next UDP/IP or GTP header, the radio bearer over which the packets are received, etc. Relay eNB 104 can remove the UDP/IP and GTP headers related to relay eNB 104, compress remaining headers, in one example, and transmit the packets to UE 110. UE 110, as described, can decompress compressed headers at a PDCP layer for processing thereof by an upper communication layer.

Figure 6:
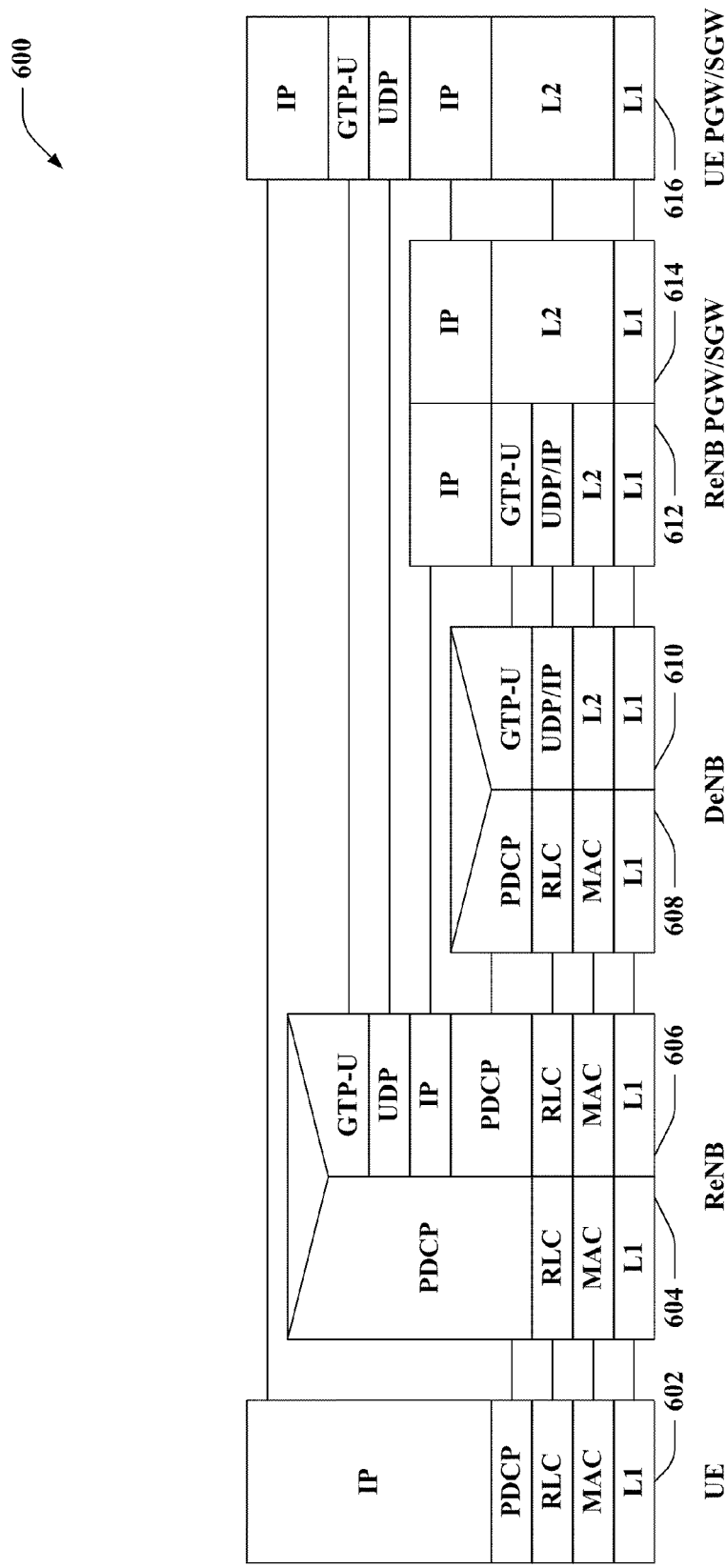
FIG. 6 is an illustration of example protocol stacks that facilitate providing IP relay functionality.

Referring to FIG. 6, example protocol stacks 600 are illustrated that facilitate communicating in a wireless network to provide relay functionality. A UE protocol stack 602 is shown comprising an L1 layer, MAC layer, an RLC layer, a PDCP layer, and an IP layer. A relay eNB (ReNB) access link protocol stack 604 is depicted having an L1 layer, MAC layer, RLC layer, and PDCP layer, along with an ReNB backhaul link protocol stack 606 having an L1 layer, MAC layer, RLC layer, PDCP layer, IP layer, UDP layer, and GTP-U layer. A donor eNB (DeNB) access link protocol stack 608 is also shown having an L1 layer, MAC layer, RLC layer, and a PDCP layer, along with a DeNB backhaul link protocol stack 610 having an L1 layer, L2 layer, a UDP/IP layer, and a GTP-U. In addition, an ReNB PGW/SGW access link protocol stack 612 is shown having an L1 layer, L2 layer, UDP/IP layer, GTP-U layer, and IP layer, as well as a ReNB PGW/SGW backhaul link protocol stack 614 including an L1 layer, L2 layer, and IP layer. Moreover, a UE PGW/SGW protocol stack 616 is depicted having an L1 layer, L2, layer, IP layer related to ReNB PGW/SGW, UDP layer, GTP-U layer, and an IP layer related to a UE.

According to an uplink communication example, a UE can communicate with an ReNB for IP communications to a UE PGW/SGW. In this regard, UE can communicate over L1, MAC, RLC, and PDCP layers with the ReNB (e.g., using a EUTRA-Uu interface), as shown between protocol stacks 602 and 604. The UE can tunnel IP layer communications through the ReNB and other entities to the UE PGW/SGW, which assigns an IP address to the UE, as shown between protocol stacks 602 and 616. To facilitate such tunneling, the ReNB can insert an IP header to communicate access link packets to an ReNB PGW/SGW through one or more other nodes on the backhaul link, as shown between protocol stacks 606 and 612. In addition, ReNB inserts GTP-U and UDP headers related to the UE PGW/SGW, as shown between protocol stacks 606 and 616, to facilitate the tunneling.

Moreover, ReNB and can communicate with a DeNB over L1, MAC, RLC, and PDCP layers (e.g., using an EUTRA-Un interface), as shown between protocol stacks 606 and 608. The DeNB can remove the PDCP, RLC, and MAC layers, which facilitate air communications, and can subsequently communicate with ReNB PGW/SGW over L1, L2, UDP/IP, and GTP-U layers, as shown between protocol stacks 610 and 612. In this regard, DeNB can add the GTP-U and UDP/IP layers related to ReNB the PGW/SGW to tunnel the GTP-U, UDP, and IP layers of the ReNB to the ReNB PGW/SGW. ReNB PGW/SGW can remove the GTP-U and UDP/IP layers, and can subsequently communicate with UE PGW/SGW over L1, L2, and IP layers to tunnel IP communications from UE, as described. Thus, as described, IP and/or GTP headers between the ReNB and DeNB can be compressed and decompressed using a GTP RoHC profile, as described above.

Figure 7:
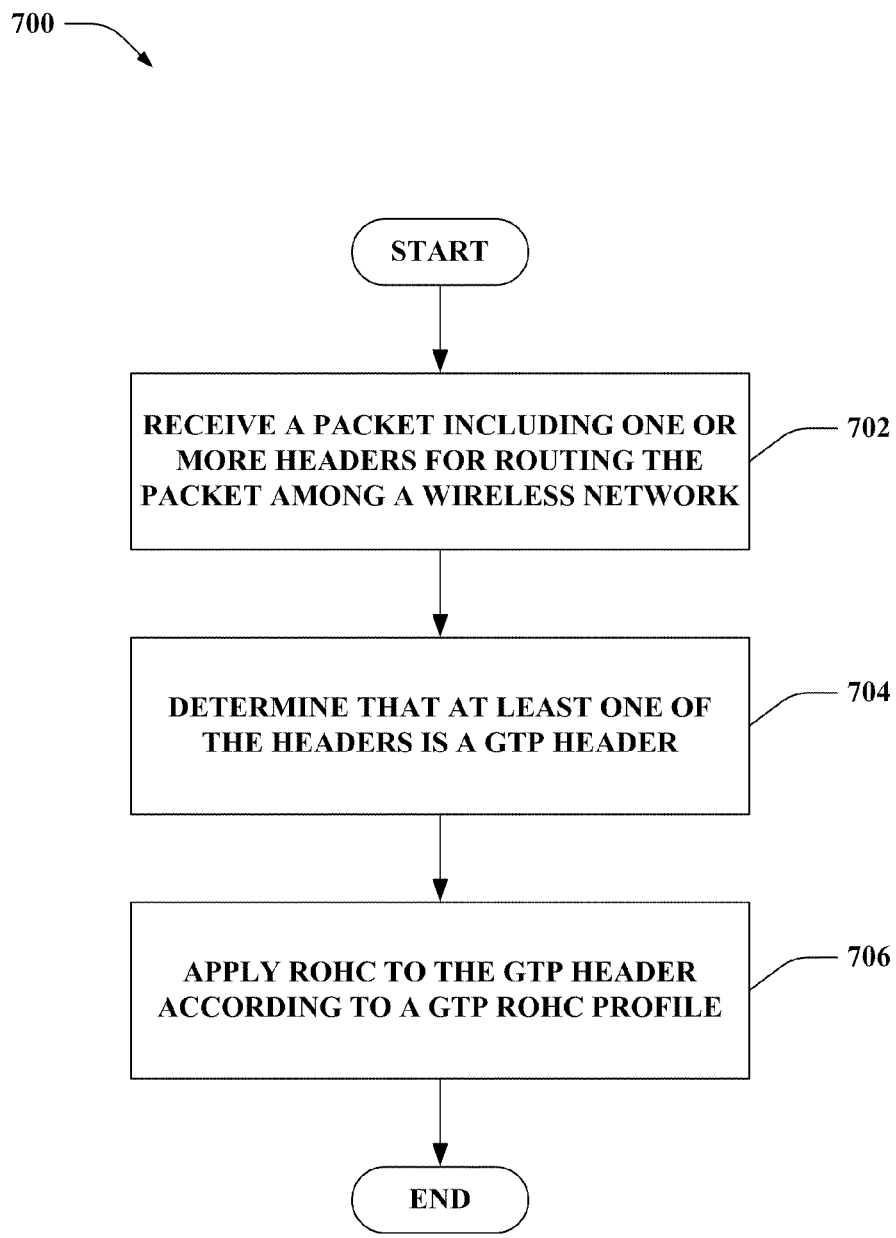
FIG. 7 is an illustration of an example methodology for compressing one or more GTP headers using a GTP RoHC profile.
Figure 8:
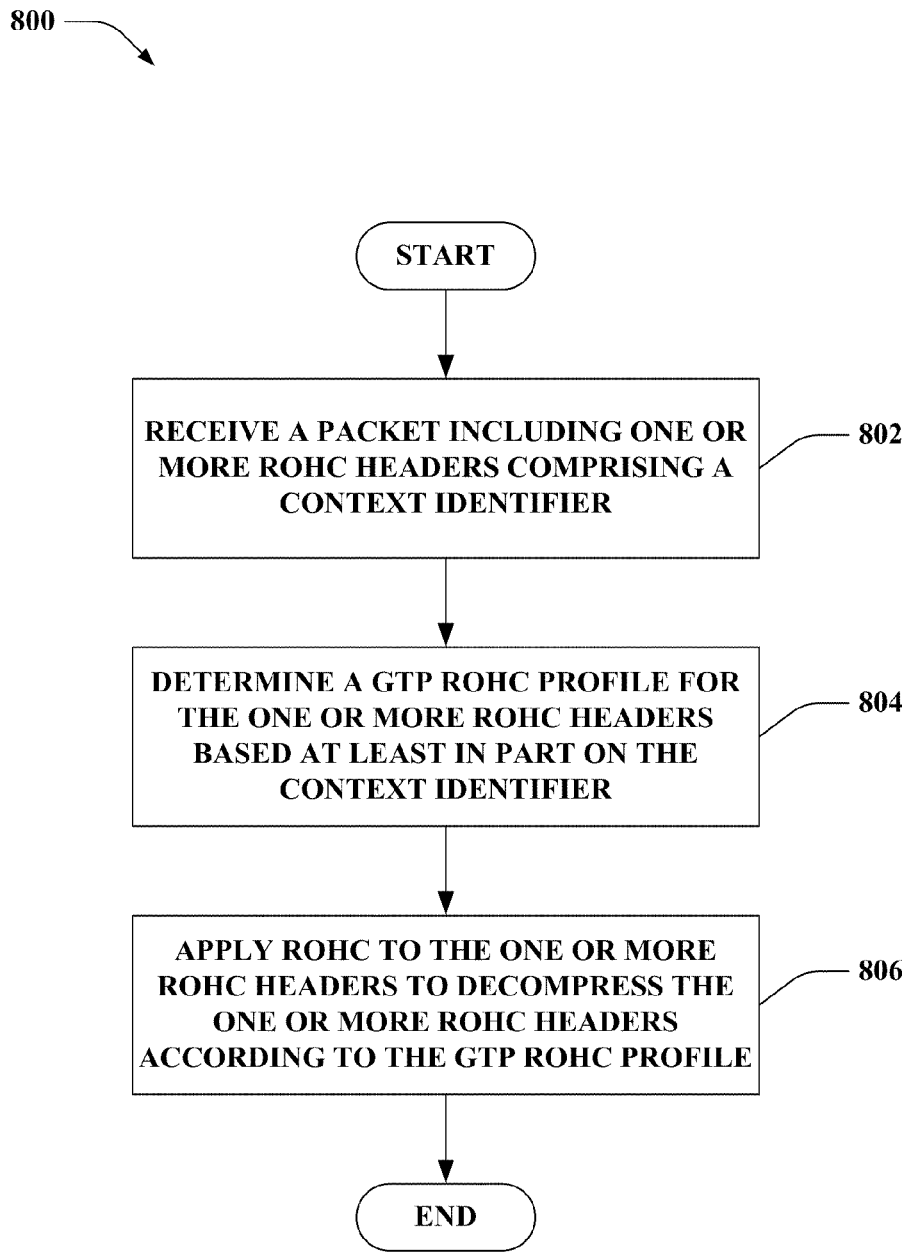
FIG. 8 is an illustration of an example methodology that decompresses one or more RoHC headers to one or more GTP headers.
Figure 9:
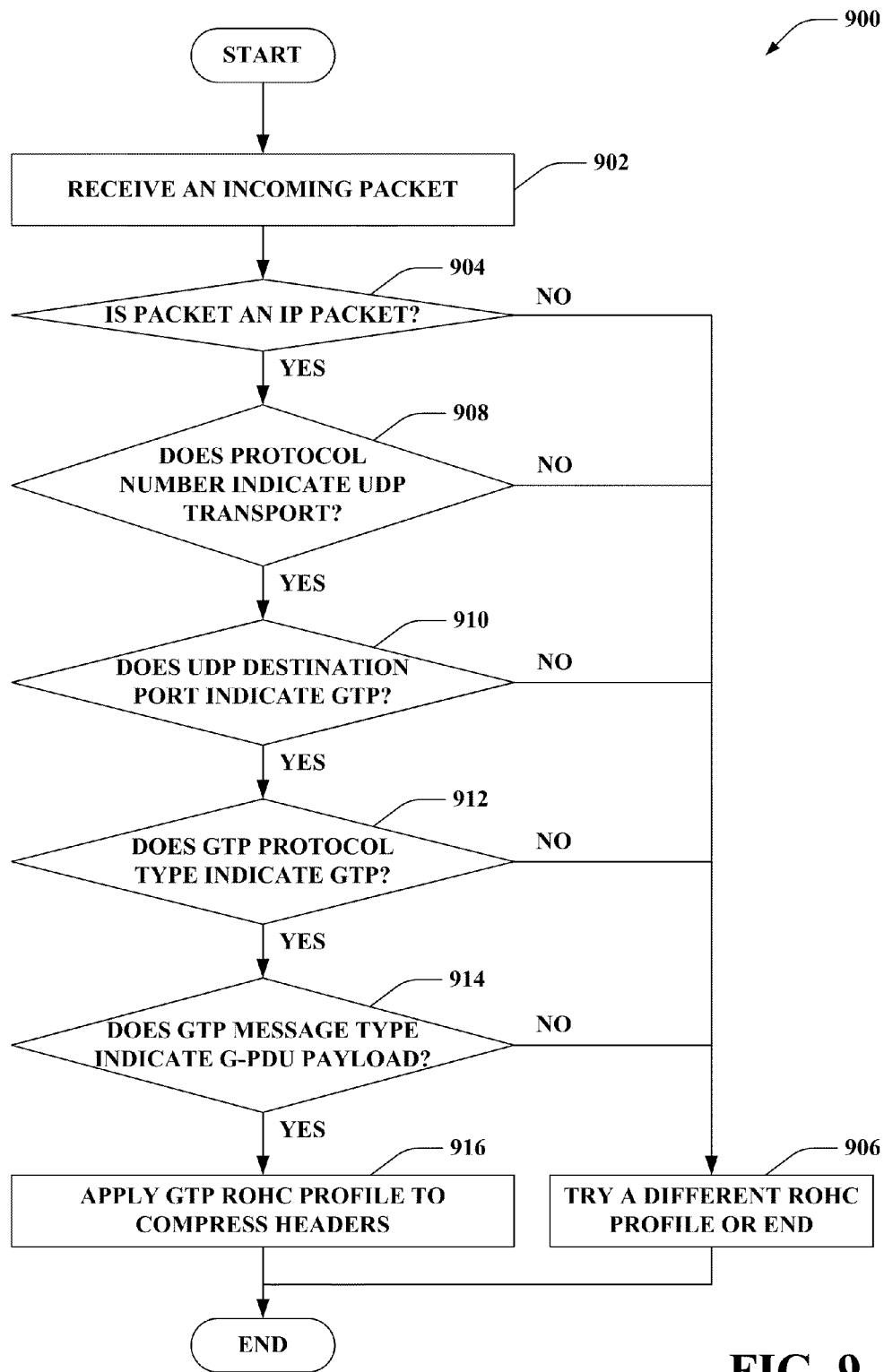
FIG. 9 is an illustration of an example methodology for determining whether a packet includes one or more compressible GTP headers.

Referring to FIGS. 7-9, methodologies relating to RoHC compressing and decompressing packet headers for relay communication are illustrated. While, for purposes of simplicity of explanation, the methodologies are shown and described as a series of acts, it is to be understood and appreciated that the methodologies are not limited by the order of acts, as some acts may, in accordance with one or more aspects, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more aspects.

Turning to FIG. 7, an example methodology 700 that facilitates applying RoHC to one or more GTP headers is illustrated. At 702, a packet including one or more headers for routing the packet among a wireless network can be received. For example, the one or more headers can be GTP headers, as described. At 704, it can be determined that at least one of the headers is a GTP header. In an example, this can include also determining that the GTP header is one that should be compressed, which can entail analyzing one or more parameters of the GTP header, as described. At 706, RoHC can be applied to the GTP header according to a GTP RoHC profile. The GTP RoHC profile, for example, can be defined as described above. In addition, for example, RoHC v1 or v2 can be applied. Where there are multiple GTP headers in the packet, as described previously, and RoHC v1 is applied, it can be applied recursively at 706 to compress the multiple GTP headers. In addition, it is to be appreciated that the packet can include a baseheader that is encapsulated in one of the GTP headers; this baseheader can be compressed according to a RoHC profile as well. Moreover, applying RoHC, for example, can include replacing the one or more GTP headers with one or more RoHC headers, which can include a context identifier related to a RoHC context to decompress the one or more RoHC headers, as described.

Referring to FIG. 8, an example methodology 800 is depicted that facilitates applying RoHC to one or more compressed headers to decompress the headers. At 802, a packet including one or more RoHC headers comprising a context identifier can be received. As described, the context identifier can have been previously obtained from an access point or other device along with an associated RoHC context. The RoHC context can include one or more parameters regarding decompressing the related RoHC header, for example. At 804, a GTP RoHC profile can be determined for the one or more RoHC headers based at least in part on the context identifier. For example, the received context can be located based at least in part on the context identifier, and the RoHC context can include an associated profile type, which can be GTP in this example. At 806, RoHC can be applied to the one or more RoHC headers to decompress the one or more RoHC headers according to the GTP RoHC profile. For example, RoHC can be applied further based on the RoHC context, which can include utilizing one or more parameters of the RoHC context to decompress the RoHC headers. As described, in an example, where there are multiple RoHC headers in the packet and RoHC v1 is used, the multiple RoHC headers can be recursively decompressed to create corresponding GTP headers.

Turning to FIG. 9, an example methodology 900 that facilitates determining whether a packet includes one or more compressible GTP headers is illustrated. At 902, an incoming packet can be received. As described, the packet can have one or more headers. At 904, it can be determined whether the packet is an IP packet. If not, a different RoHC profile can be tried or the methodology can end at 906. If the packet is an IP packet, at 908, it can be determined whether a protocol number (or next header) in an IP header of the IP packet indicates UDP transport. If not, a different RoHC profile can be tried or the methodology can end at 906. If the protocol number does indicate UDP transport, at 910, it can be determined whether a UDP destination port indicates GTP. As described, port number 2152, in one example, can indicate GTP. If not, a different RoHC profile can be tried or the methodology can end at 906.

If the UDP destination port does indicate GTP, at 912, it can be determined whether the GTP protocol header indicates GTP. If not, a different RoHC profile can be tried or the methodology can end at 906. If GTP protocol header does indicate GTP, at 914, it can be determined whether a GTP message type indicates G-PDU payload (e.g., message type 255). If not, a different RoHC profile can be tried or the methodology can end at 906. If the GTP message type does indicate G-PDU, GTP RoHC profile can be applied to compress headers at 916. It is to be appreciated that additional conditions can be verified (such as presence of extension headers, optional fields, etc., as described) in determining whether the packet includes one or more compressible GTP headers.

It will be appreciated that, in accordance with one or more aspects described herein, inferences can be made regarding determining whether a header is a compressible GTP header, and/or other aspects described herein. As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Figure 10:
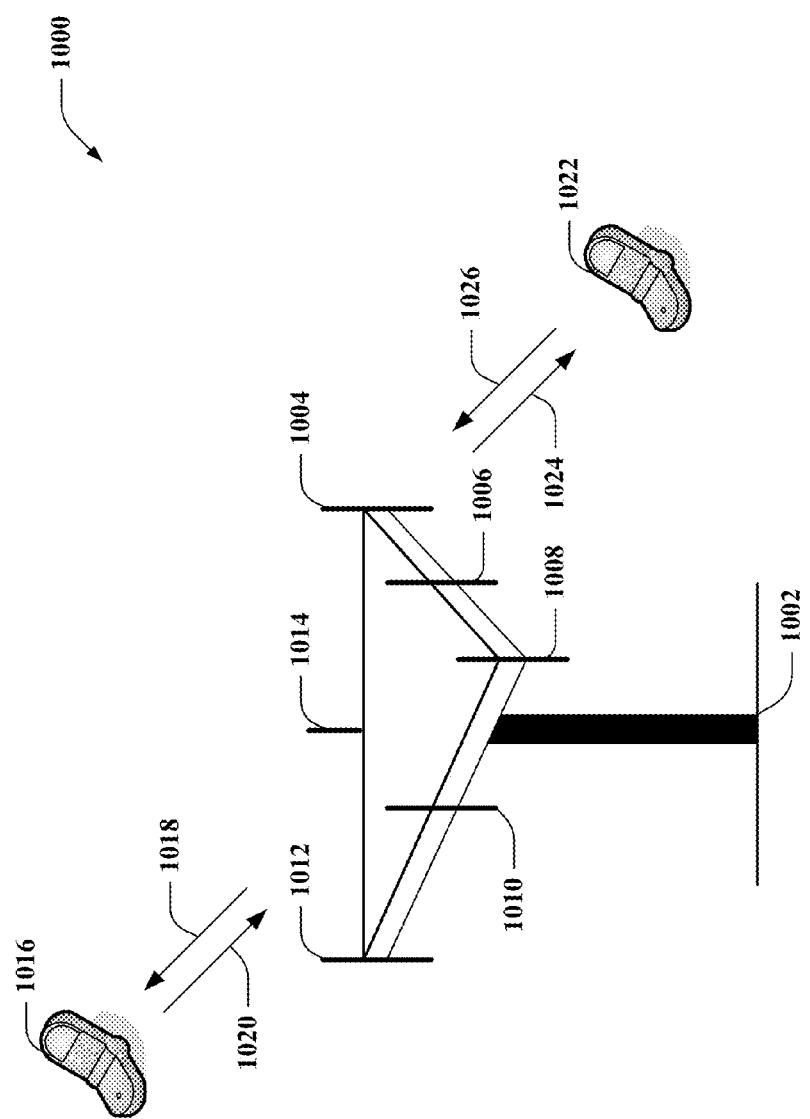
FIG. 10 is an illustration of a wireless communication system in accordance with various aspects set forth herein.

Referring now to FIG. 10, a wireless communication system 1000 is illustrated in accordance with various embodiments presented herein. System 1000 comprises a base station 1002 that can include multiple antenna groups. For example, one antenna group can include antennas 1004 and 1006, another group can comprise antennas 1008 and 1010, and an additional group can include antennas 1012 and 1014. Two antennas are illustrated for each antenna group; however, more or fewer antennas can be utilized for each group. Base station 1002 can additionally include a transmitter chain and a receiver chain, each of which can in turn comprise a plurality of components associated with signal transmission and reception (e.g., processors, modulators, multiplexers, demodulators, demultiplexers, antennas, etc.), as will be appreciated by one skilled in the art.

Base station 1002 can communicate with one or more mobile devices such as mobile device 1016 and mobile device 1022; however, it is to be appreciated that base station 1002 can communicate with substantially any number of mobile devices similar to mobile devices 1016 and 1022. Mobile devices 1016 and 1022 can be, for example, cellular phones, smart phones, laptops, handheld communication devices, handheld computing devices, satellite radios, global positioning systems, PDAs, and/or any other suitable device for communicating over wireless communication system 1000. As depicted, mobile device 1016 is in communication with antennas 1012 and 1014, where antennas 1012 and 1014 transmit information to mobile device 1016 over a forward link 1018 and receive information from mobile device 1016 over a reverse link 1020. Moreover, mobile device 1022 is in communication with antennas 1004 and 1006, where antennas 1004 and 1006 transmit information to mobile device 1022 over a forward link 1024 and receive information from mobile device 1022 over a reverse link 1026. In a frequency division duplex (FDD) system, forward link 1018 can utilize a different frequency band than that used by reverse link 1020, and forward link 1024 can employ a different frequency band than that employed by reverse link 1026, for example. Further, in a time division duplex (TDD) system, forward link 1018 and reverse link 1020 can utilize a common frequency band and forward link 1024 and reverse link 1026 can utilize a common frequency band.

Each group of antennas and/or the area in which they are designated to communicate can be referred to as a sector of base station 1002. For example, antenna groups can be designed to communicate to mobile devices in a sector of the areas covered by base station 1002. In communication over forward links 1018 and 1024, the transmitting antennas of base station 1002 can utilize beamforming to improve signal-to-noise ratio of forward links 1018 and 1024 for mobile devices 1016 and 1022. Also, while base station 1002 utilizes beamforming to transmit to mobile devices 1016 and 1022 scattered randomly through an associated coverage, mobile devices in neighboring cells can be subject to less interference as compared to a base station transmitting through a single antenna to all its mobile devices. Moreover, mobile devices 1016 and 1022 can communicate directly with one another using a peer-to-peer or ad hoc technology (not shown).

According to an example, system 1000 can be a multiple-input multiple-output (MIMO) communication system. Further, system 1000 can utilize substantially any type of duplexing technique to divide communication channels (e.g., forward link, reverse link, . . . ) such as FDD, FDM, TDD, TDM, CDM, and the like. In addition, communication channels can be orthogonalized to allow simultaneous communication with multiple devices over the channels; in one example, OFDM can be utilized in this regard. Thus, the channels can be divided into portions of frequency over a period of time. In addition, frames can be defined as the portions of frequency over a collection of time periods; thus, for example, a frame can comprise a number of OFDM symbols. The base station 1002 can communicate to the mobile devices 1016 and 1022 over the channels, which can be create for various types of data. For example, channels can be created for communicating various types of general communication data, control data (e.g., quality information for other channels, acknowledgement indicators for data received over channels, interference information, reference signals, etc.), and/or the like.

Figure 11:
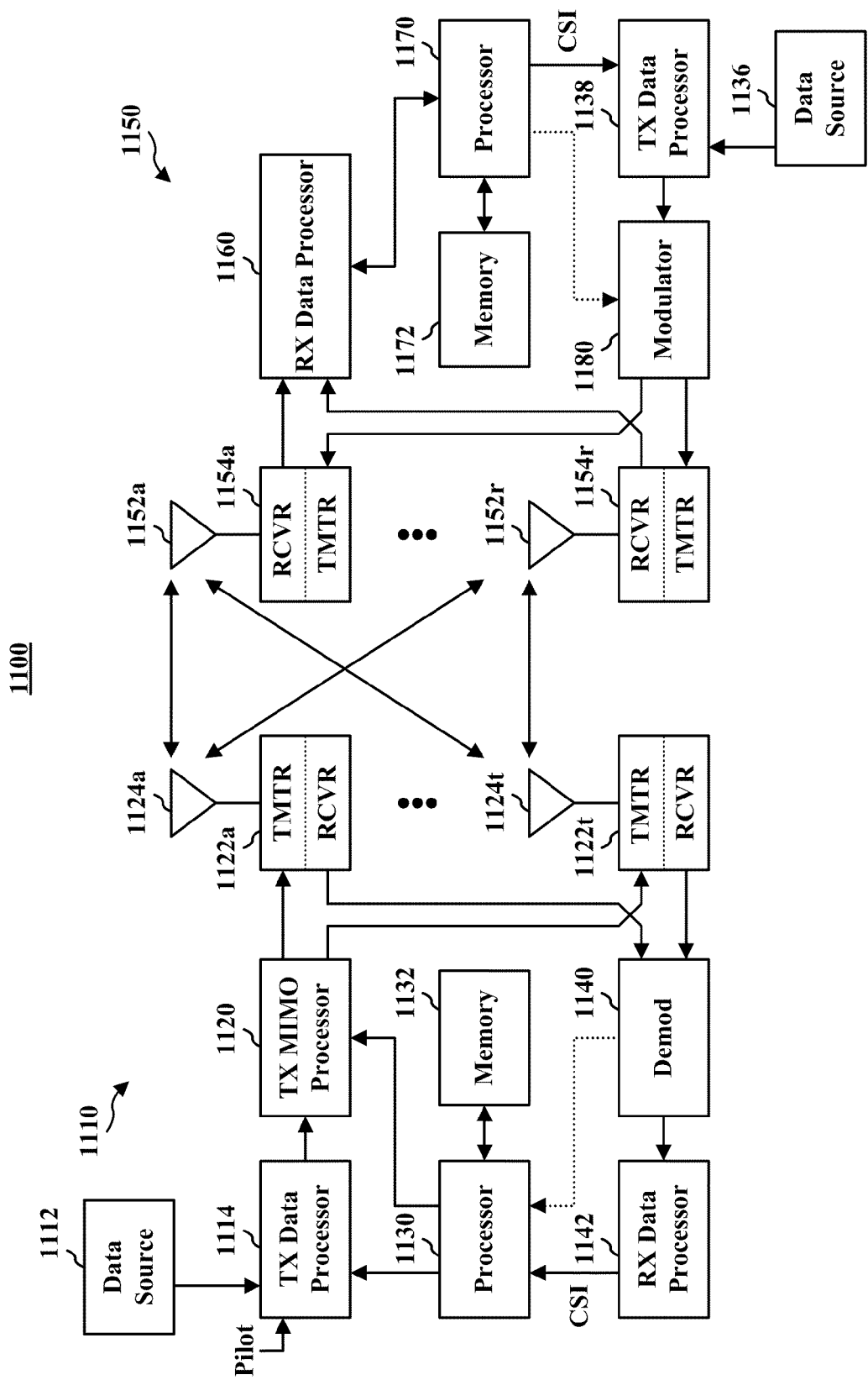
FIG. 11 is an illustration of an example wireless network environment that can be employed in conjunction with the various systems and methods described herein.

FIG. 11 shows an example wireless communication system 1100. The wireless communication system 1100 depicts one base station 1110 and one mobile device 1150 for sake of brevity. However, it is to be appreciated that system 1100 can include more than one base station and/or more than one mobile device, wherein additional base stations and/or mobile devices can be substantially similar or different from example base station 1110 and mobile device 1150 described below. In addition, it is to be appreciated that base station 1110 and/or mobile device 1150 can employ the systems (FIGS. 1-5, and 10), protocol stacks (FIG. 6) and/or methods (FIGS. 7-9) described herein to facilitate wireless communication therebetween.

At base station 1110, traffic data for a number of data streams is provided from a data source 1112 to a transmit (TX) data processor 1114. According to an example, each data stream can be transmitted over a respective antenna. TX data processor 1114 formats, codes, and interleaves the traffic data stream based on a particular coding scheme selected for that data stream to provide coded data.

The coded data for each data stream can be multiplexed with pilot data using orthogonal frequency division multiplexing (OFDM) techniques. Additionally or alternatively, the pilot symbols can be frequency division multiplexed (FDM), time division multiplexed (TDM), or code division multiplexed (CDM). The pilot data is typically a known data pattern that is processed in a known manner and can be used at mobile device 1150 to estimate channel response. The multiplexed pilot and coded data for each data stream can be modulated (e.g., symbol mapped) based on a particular modulation scheme (e.g., binary phase-shift keying (BPSK), quadrature phase-shift keying (QPSK), M-phase-shift keying (M-PSK), M-quadrature amplitude modulation (M-QAM), etc.) selected for that data stream to provide modulation symbols. The data rate, coding, and modulation for each data stream can be determined by instructions performed or provided by processor 1130.

The modulation symbols for the data streams can be provided to a TX MIMO processor 1120, which can further process the modulation symbols (e.g., for OFDM). TX MIMO processor 1120 then provides $N_T$ modulation symbol streams to $N_T$ transmitters (TMTR) 1122a through 1122t. In various aspects, TX MIMO processor 1120 applies beamforming weights to the symbols of the data streams and to the antenna from which the symbol is being transmitted.

Each transmitter 1122 receives and processes a respective symbol stream to provide one or more analog signals, and further conditions (e.g., amplifies, filters, and upconverts) the analog signals to provide a modulated signal suitable for transmission over the MIMO channel. Further, $N_T$ modulated signals from transmitters 1122a through 1122t are transmitted from $N_T$ antennas 1124a through 1124t, respectively.

At mobile device 1150, the transmitted modulated signals are received by $N_R$ antennas 1152a through 1152r and the received signal from each antenna 1152 is provided to a respective receiver (RCVR) 1154a through 1154r. Each receiver 1154 conditions (e.g., filters, amplifies, and downconverts) a respective signal, digitizes the conditioned signal to provide samples, and further processes the samples to provide a corresponding "received" symbol stream.

An RX data processor 1160 can receive and process the $N_R$ received symbol streams from $N_R$ receivers 1154 based on a particular receiver processing technique to provide $N_T$ "detected" symbol streams. RX data processor 1160 can demodulate, deinterleave, and decode each detected symbol stream to recover the traffic data for the data stream. The processing by RX data processor 1160 is complementary to that performed by TX MIMO processor 1120 and TX data processor 1114 at base station 1110.

A processor 1170 can periodically determine which precoding matrix to utilize as discussed above. Further, processor 1170 can formulate a reverse link message comprising a matrix index portion and a rank value portion.

The reverse link message can comprise various types of information regarding the communication link and/or the received data stream. The reverse link message can be processed by a TX data processor 1138, which also receives traffic data for a number of data streams from a data source 1136, modulated by a modulator 1180, conditioned by transmitters 1154a through 1154r, and transmitted back to base station 1110.

At base station 1110, the modulated signals from mobile device 1150 are received by antennas 1124, conditioned by receivers 1122, demodulated by a demodulator 1140, and processed by a RX data processor 1142 to extract the reverse link message transmitted by mobile device 1150. Further, processor 1130 can process the extracted message to determine which precoding matrix to use for determining the beamforming weights.

Processors 1130 and 1170 can direct (e.g., control, coordinate, manage, etc.) operation at base station 1110 and mobile device 1150, respectively. Respective processors 1130 and 1170 can be associated with memory 1132 and 1172 that store program codes and data. Processors 1130 and 1170 can also perform computations to derive frequency and impulse response estimates for the uplink and downlink, respectively.

Figure 12:
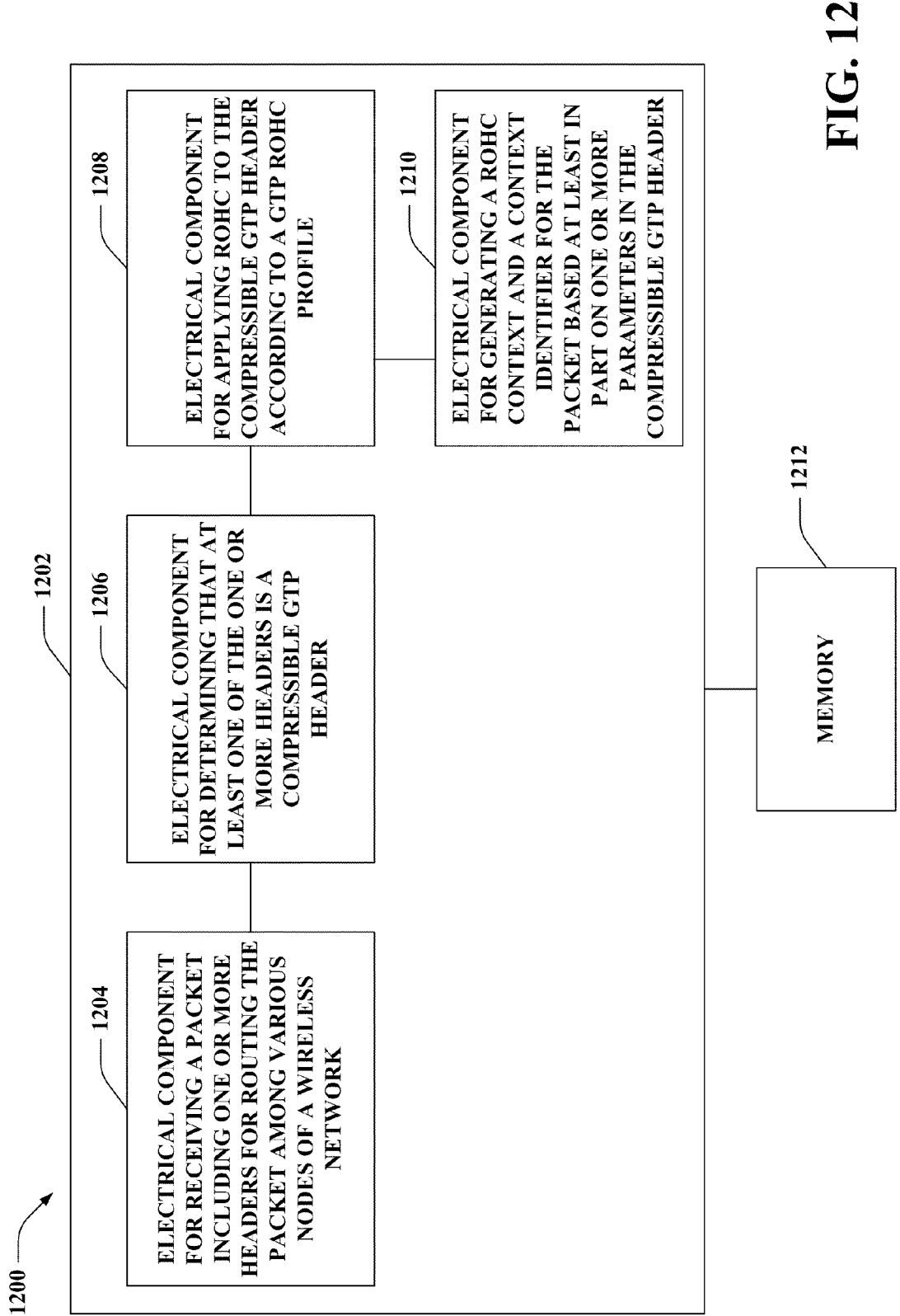
FIG. 12 is an illustration of an example system that facilitates compressing GTP headers according to a GTP RoHC profile.

With reference to FIG. 12, illustrated is a system 1200 that facilitates compressing one or more GTP headers using a GTP RoHC profile. For example, system 1200 can reside at least partially within a base station, mobile device, etc. It is to be appreciated that system 1200 is represented as including functional blocks, which can be functional blocks that represent functions implemented by a processor, software, or combination thereof (e.g., firmware). System 1200 includes a logical grouping 1202 of electrical components that can act in conjunction. For instance, logical grouping 1202 can include an electrical component for receiving a packet including one or more headers for routing the packet among various nodes of a wireless network 1204. For example, as described, the headers can include GTP headers. Additionally, logical grouping 1202 can include an electrical component for determining that at least one of the one or more headers is a compressible GTP header 1206. As described, this can include not only determining that the header is a GTP header, but also that it includes one or more other characteristics or parameters (e.g., that it lacks optional fields, extension headers, etc.).

Moreover, logical grouping 1202 can include an electrical component for applying RoHC to the compressible GTP header according to a GTP RoHC profile 1208. As described, for example, the GTP RoHC profile can be defined as described above to compress one or more static fields, non-static fields with predictable values, etc., of a GTP header. Details of compression, for example, can be specified in the GTP RoHC profile, in a hardcoding or configuration, a network specification, and/or the like. In addition, logical grouping 1202 can include an electrical component for generating a RoHC context and a context identifier for the packet based at least in part on one or more parameters in the compressible GTP header 1210. As described, for example, the RoHC context can include one or more parameters for decompressing a subsequent compressed header associated with the context identifier. Additionally, system 1200 can include a memory 1212 that retains instructions for executing functions associated with electrical components 1204, 1206, 1208, and 1210. While shown as being external to memory 1212, it is to be understood that one or more of electrical components 1204, 1206, 1208, and 1210 can exist within memory 1212.

Figure 13:
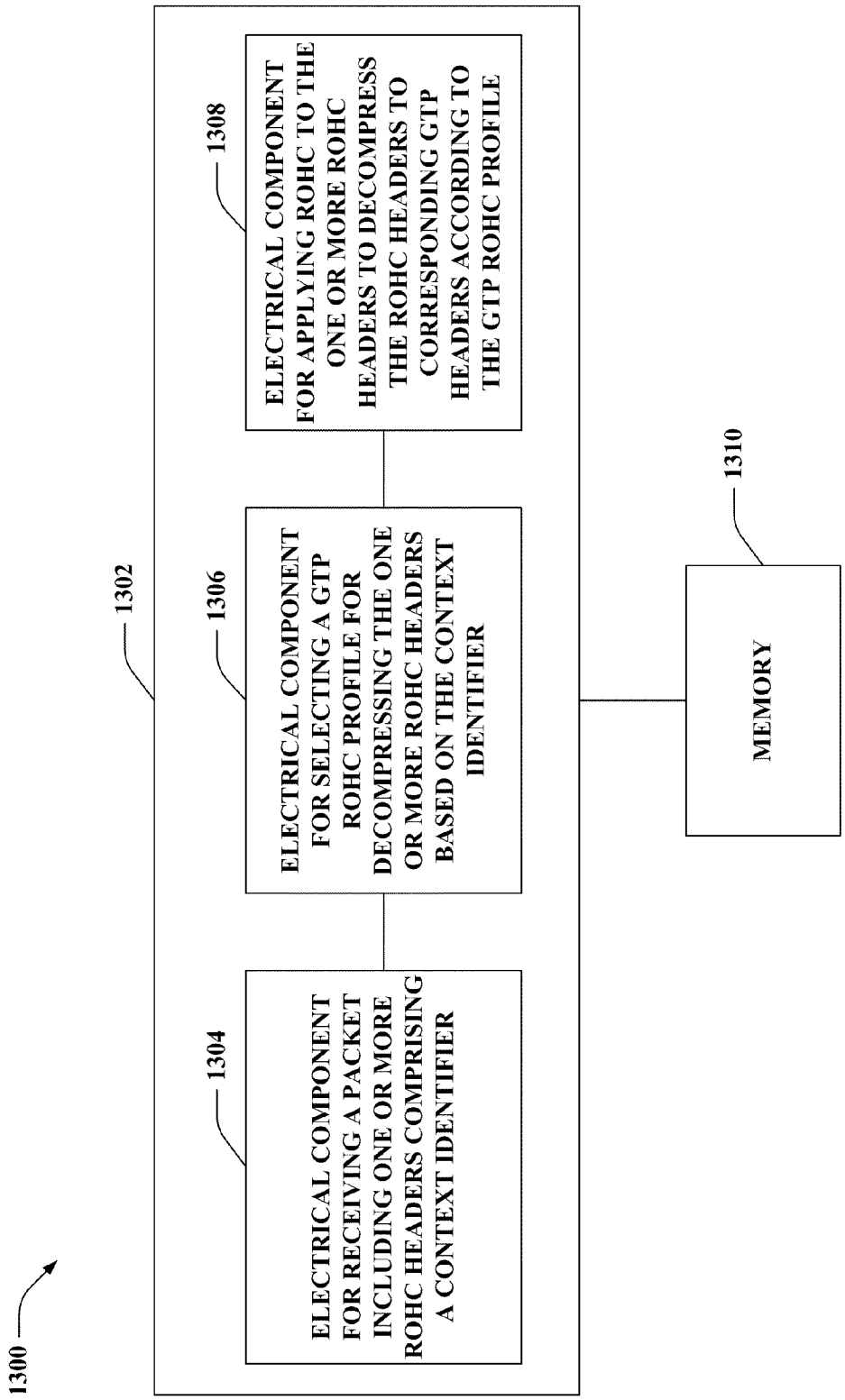
FIG. 13 is an illustration of an example system that facilitates decompressing one or more RoHC headers into one or more GTP headers.

With reference to FIG. 13, illustrated is a system 1300 that facilitates decompressing RoHC headers according to a GTP RoHC profile. For example, system 1300 can reside at least partially within a base station, mobile device, etc. It is to be appreciated that system 1300 is represented as including functional blocks, which can be functional blocks that represent functions implemented by a processor, software, or combination thereof (e.g., firmware). System 1300 includes a logical grouping 1302 of electrical components that can act in conjunction. For instance, logical grouping 1302 can include an electrical component for receiving a packet including one or more RoHC headers comprising a context identifier 1304. Additionally, logical grouping 1302 can include an electrical component for selecting a GTP RoHC profile for decompressing the one or more RoHC headers based on the context identifier 1306. For example, as described, the context identifier can have been previously received along with an associated RoHC context, which includes parameters for decompressing one or more subsequent RoHC headers.

Moreover, logical grouping 1302 can include an electrical component for applying RoHC to the one or more RoHC headers to decompress the RoHC headers to corresponding GTP headers according to the GTP RoHC profile 1308. As described, for example, electrical component 1308 can additionally utilize one or more parameters of a RoHC context corresponding to the context identifier when applying RoHC to decompress the one or more RoHC headers. Additionally, system 1300 can include a memory 1310 that retains instructions for executing functions associated with electrical components 1304, 1306, and 1308. While shown as being external to memory 1310, it is to be understood that one or more of electrical components 1304, 1306, and 1308 can exist within memory 1310.

The various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal Additionally, in some aspects, the steps and/or actions of a method or algorithm may reside as one or any combination or set of codes and/or instructions on a machine readable medium and/or computer readable medium, which may be incorporated into a computer program product.

In one or more aspects, the functions described may be implemented in hardware, software, firmware, or any combination thereof. If implemented in software, the functions, procedures, etc. may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Furthermore, to the extent that the term "includes" is used in either the detailed description or the claims, such term is intended to be inclusive in a manner similar to the term "comprising" as "comprising" is interpreted when employed as a transitional word in a claim. Furthermore, although elements of the described aspects and/or aspects may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

What is claimed is:

1. A method, comprising:
receiving a packet including one or more headers for routing the packet among various nodes of a wireless network;
verifying that a message type in at least one of the one or more headers indicates a general packet radio service (GPRS) tunneling protocol (GTP) protocol data unit;
determining that the at least one of the one or more headers is a compressible GTP header based on verifying that the message type in the at least one of the one or more headers indicates the GTP protocol data unit;
selecting a GTP robust header compression (RoHC) profile from a plurality of RoHC profiles based on the packet; and
generating a compressed GTP header by applying RoHC to the compressible GTP header according to the selected GTP RoHC profile, wherein the applying of the RoHC to the compressible GTP header comprises generating a RoHC header with a context identifier and replacing the GTP header with the RoHC header in the packet and recursively applying the RoHC to each of a plurality of the one or more headers according to the selected GTP RoHC profile.

2. The method of claim 1, wherein the determining that the at least one of the one or more headers is a compressible GTP header includes determining that the packet is an internet protocol (IP) packet.

3. The method of claim 2, wherein the determining that the at least one of the one or more headers is a compressible GTP header further includes verifying that a protocol number or next header in an IP header of the IP packet indicates a user datagram protocol transport in the IP packet.

4. The method of claim 3, wherein the determining that the at least one of the one or more headers is a compressible GTP header further includes verifying that a destination port related to the user datagram protocol transport indicates a GTP.

5. The method of claim 1, wherein the determining that the at least one of the one or more headers is a compressible GTP header further includes determining that a protocol type in the compressible GTP header indicates GTP.

6. The method of claim 1, wherein the determining that the at least one of the one or more headers is a compressible GTP header further includes verifying that one or more extension headers are not present in the compressible GTP header.

7. The method of claim 1, wherein the determining that the at least one of the one or more headers is a compressible GTP header further includes verifying that one or more optional fields are not present in the compressible GTP header.

8. The method of claim 1, further comprising applying the RoHC to a baseheader of the packet according to a disparate RoHC profile, wherein the baseheader is encapsulated by the GTP header.

9. The method of claim 1, further comprising generating a message sequence number for the packet from a sequence number in the compressible GTP header.

10. The method of claim 1, further comprising generating a RoHC context and the context identifier for the packet based at least in part on one or more parameters in the packet.

11. The method of claim 10, further comprising transmitting the RoHC context and the context identifier to an access point for decompressing the compressed GTP header.

12. The method of claim 1, wherein the applying the RoHC to the compressed GTP header further includes removing the compressed GTP header from the packet.

13. The method of claim 1, further comprising:
determining a RoHC context associated with the packet; and
selecting the GTP RoHC profile based at least in part on the RoHC context.

14. A wireless communications apparatus, comprising:
at least one processor configured to:
obtain a packet including one or more headers;
verify that a message type in at least one of the one or more headers indicates a general packet radio service (GPRS) tunneling protocol (GTP) protocol data unit;
determine that at least one of the one or more headers is a compressible GTP header based on verifying that the message type in the at least one of one or more headers indicates the GTP protocol data unit;
select a GTP robust header compression (RoHC) profile from a plurality of RoHC profiles based on the packet; and
generate a compressed GTP header by applying RoHC to the compressible GTP header according to the selected GTP RoHC profile, wherein the applying of the RoHC to the compressible GTP header comprises generating a RoHC header with a context identifier and replacing the GTP header with the RoHC header in the packet and recursively applying the RoHC to each of a plurality of the one or more headers according to the selected GTP RoHC profile; and
a memory coupled to the at least one processor.

15. The wireless communications apparatus of claim 14, wherein the at least one processor is further configured to select the GTP RoHC profile based at least in part on one or more parameters of the at least one of the one or more headers.

16. The wireless communications apparatus of claim 14, wherein, to determine that the at least one of the one or more headers is the compressible GTP header, the at least one processor is configured to determine that the packet is an internet protocol (IP) packet.

17. The wireless communications apparatus of claim 16, wherein, to determine that the at least one of the one or more headers is the compressible GTP header, the at least one processor is further configured to verify one or more parameters in a header of the IP packet.

18. The wireless communications apparatus of claim 14, wherein, to determine that the at least one of the one or more headers is the compressible GTP header, the at least one processor is configured to verify one or more parameters in the GTP header.

19. The wireless communications apparatus of claim 18, wherein the one or more parameters in the GTP header relates to one or more flags that indicate presence of extension headers or optional fields.

20. The wireless communications apparatus of claim 14, wherein the at least one processor is further configured to determine a disparate type of another one of the one or more headers to be a disparate GTP header that is compressible and to compress the GTP header and the disparate GTP header using recursive RoHC.

21. An apparatus, comprising:
means for receiving a packet including one or more headers for routing the packet among various nodes of a wireless network;
means for verifying that a message type in at least one of the one or more headers indicates a general packet radio service (GPRS) tunneling protocol (GTP) protocol data unit;
means for determining that at least one of the one or more headers is a compressible GTP header based on verifying that the message type in the at least one of the one or more headers indicates the GTP protocol data unit;
means for selecting a GTP robust header compression (RoHC) profile from a plurality of RoHC profiles based on the packet; and
means for generating a compressed GTP header by applying RoHC to the compressible GTP header according to the selected GTP RoHC profile, wherein the applying of the RoHC to the compressible GTP header comprises generating a RoHC header with a context identifier and replacing the GTP header with the RoHC header in the packet and recursively applying the RoHC to each of a plurality of the one or more headers according to the selected GTP RoHC profile.

22. The apparatus of claim 21, wherein the means for determining determines that the at least one of the one or more headers is a compressible GTP header based at least in part on determining that the packet is an internet protocol (IP) packet.

23. The apparatus of claim 22, wherein the means for determining determines that the at least one of the one or more headers is a compressible GTP header based at least in part on verifying one or more parameters in an IP header of the IP packet.

24. The apparatus of claim 21, wherein the means for determining determines that the at least one of the one or more headers is a compressible GTP header based at least in part on verifying one or more parameters in the compressible GTP header.

25. The apparatus of claim 21, wherein the means for determining determines at least another one of the one or more headers is a disparate compressible GTP header, and the means for applying recursively applies RoHC to the compressible GTP header and the disparate compressible GTP header.

26. The apparatus of claim 21, further comprising means for generating a RoHC context and the context identifier for the packet based at least in part on one or more parameters in the compressible GTP header.

27. A non-transitory computer-readable medium storing computer executable code for wireless communication, comprising:
code for causing at least one computer to obtain a packet including one or more headers;
code for causing at least one computer to verify that a message type in at least one of the one or more headers indicates a general packet radio service (GPRS) tunneling protocol (GTP) protocol data unit;
code for causing the at least one computer to determine, based on one or more of a type of the packet, a type of protocol in the one or more headers, an absence of an extension header in the one or more headers, an absence of an optional field in the one or more headers, or verifying that the message type in the at least one of one or more headers indicates the GTP protocol data unit that at least one of the one or more headers is a compressible GTP header;
code for causing the at least one computer to select a GTP robust header compression (RoHC) profile from a plurality of RoHC profiles based on the packet; and
code for causing the at least one computer to generate a compressed GTP header by applying RoHC to the compressible GTP header according to the selected GTP RoHC profile, wherein the applying of the RoHC to the compressible GTP header comprises generating a RoHC header with a context identifier and replacing the GTP header with the RoHC header in the packet and recursively applying the RoHC to each of a plurality of the one or more headers according to the selected GTP RoHC profile.

28. The non-transitory computer-readable medium of claim 27, wherein the computer-readable medium further comprises code for causing the at least one computer to select the GTP RoHC profile based at least in part on one or more parameters of the at least one of the one or more headers.

29. The non-transitory computer-readable medium of claim 27, wherein the code for causing the at least one computer to determine determines the type of the at least one of the one or more headers as the GTP header based at least in part on determining that the packet is an internet protocol (IP) packet.

30. The non-transitory computer-readable medium of claim 29, wherein the code for causing the at least one computer to determine determines the type of the at least one of the one or more headers as the GTP header further based at least in part on verifying one or more parameters in a header of the IP packet.

31. The non-transitory computer-readable medium of claim 27, wherein the code for causing the at least one computer to determine determines the type of the at least one of the one or more headers as the GTP header further based at least in part on verifying one or more parameters in the GTP header.

32. The non-transitory computer-readable medium of claim 31, wherein the one or more parameters in the GTP header relates to one or more flags that indicate presence of extension headers or optional fields.

33. The non-transitory computer-readable medium of claim 27, wherein the code for causing the at least one computer to determine determines a disparate type of another one of the one or more headers to be a disparate GTP header, and the code for causing the at least one computer to compress compresses the GTP header and the disparate GTP header using recursive RoHC.

34. An apparatus, comprising:
a receiving component that obtains a packet including one or more headers for routing the packet among various nodes of a wireless network;
a verification component that verifies that a message type in at least one of the one or more headers indicates a general packet radio service (GPRS) tunneling protocol (GTP) protocol data unit;
a robust header compression (RoHC) profile selecting component that determines that at least one of the one or more headers is a compressible GTP header based on verifying that the message type in the at least one of the one or more headers indicates the GTP protocol data unit, and selects a GTP RoHC profile from a plurality of RoHC profiles based on the packet; and
a RoHC applying component that utilizes RoHC to generate a compressed GTP header by applying RoHC to the compressible GTP header according to the selected GTP RoHC profile, wherein the applying of the RoHC to the compressible GTP header comprises generating a RoHC header with a context identifier and replacing the GTP header with the RoHC header in the packet and recursively applying the RoHC to each of a plurality of the one or more headers according to the selected GTP RoHC profile.

35. The apparatus of claim 34, wherein the RoHC profile selecting component determines that the at least one of the one or more headers is a compressible GTP header based at least in part on determining that the packet is an internet protocol (IP) packet.

36. The apparatus of claim 35, wherein the RoHC profile selecting component determines that the at least one of the one or more headers is a compressible GTP header based at least in part on verifying one or more parameters in an IP header of the IP packet.

37. The apparatus of claim 34, wherein the RoHC profile selecting component determines that the at least one of the one or more headers is a compressible GTP header based at least in part on verifying one or more parameters in the compressible GTP header.

38. The apparatus of claim 34, wherein the RoHC profile selecting component determines at least another one of the one or more headers is a disparate compressible GTP header, and the RoHC applying component recursively applies RoHC to the compressible GTP header and the disparate compressible GTP header.

39. The apparatus of claim 34, further comprising a RoHC context component that generates a RoHC context and the context identifier for the packet based at least in part on one or more parameters in the compressible GTP header.

40. A method, comprising:
receiving a packet including one or more robust header compression (RoHC) headers comprising a context identifier, and at least one RoHC header corresponding to a compressed general packet radio service (GPRS) tunneling protocol (GTP) header, wherein the compressed GTP header is determined based on a message type in the GTP header indicating a GTP protocol data unit;
selecting a GTP RoHC profile for decompressing the one or more RoHC headers based at least in part on the context identifier, the selected GTP RoHC profile being one of a plurality of RoHC profiles; and
recursively applying RoHC to the one or more RoHC headers according to the selected GTP RoHC profile, to decompress the one or more RoHC headers to corresponding GTP headers.

41. The method of claim 40, further comprising determining a RoHC context related to the context identifier, wherein the determining the GTP RoHC profile is based at least in part on the RoHC context.

42. The method of claim 41, further comprising receiving the RoHC context and the context identifier from an access point.

43. The method of claim 41, wherein the applying RoHC to the one or more RoHC headers is based at least in part on one or more parameters in the RoHC context.

44. The method of claim 43, wherein the applying RoHC to the one or more RoHC headers is further based at least in part on one or more disparate parameters in the one or more RoHC headers.

45. A wireless communications apparatus, comprising:
at least one processor configured to:
obtain a packet including one or more robust header compression (RoHC) headers comprising a context identifier, and at least one RoHC header corresponding to a compressed general packet radio service (GPRS) tunneling protocol (GTP) header, wherein the compressed GTP header is determined based on a message type in the GTP header indicating a GTP protocol data unit;
select a GTP RoHC profile for decompressing the one or more RoHC headers based on the context identifier, the selected GTP RoHC profile being one of a plurality of RoHC profiles; and
recursively apply RoHC to the one or more RoHC headers according to the selected GTP RoHC profile, to decompress the one or more RoHC headers to corresponding GTP headers; and
a memory coupled to the at least one processor.

46. The wireless communications apparatus of claim 45, wherein the at least one processor is further configured to determine a RoHC context related to the context identifier, and the at least one processor determines the GTP RoHC profile based at least in part on the RoHC context.

47. The wireless communications apparatus of claim 46, wherein the at least one processor is further configured to receive the RoHC context from an access point.

48. The wireless communications apparatus of claim 46, wherein the at least one processor decompresses the one or more RoHC headers using RoHC based at least in part on one or more parameters in the RoHC context.

49. An apparatus, comprising:
means for receiving a packet including one or more robust header compression (RoHC) headers comprising a context identifier, and at least one RoHC header corresponding to a compressed general packet radio service (GPRS) tunneling protocol (GTP) header, wherein the compressed GTP header is determined based on a message type in the GTP header indicating a GTP protocol data unit;
means for selecting a GTP RoHC profile for decompressing the one or more RoHC headers based on the context identifier, the selected GTP RoHC profile being one of a plurality of RoHC profiles; and
means for recursively applying RoHC to the one or more RoHC headers according to the selected GTP RoHC profile, to decompress the one or more RoHC headers to corresponding GTP headers.

50. The apparatus of claim 49, wherein the means for applying determines a RoHC context related to the context identifier.

51. The apparatus of claim 50, wherein the means for receiving obtains the RoHC context from an access point.

52. The apparatus of claim 50, wherein the means for applying applies RoHC to the one or more RoHC headers based at least in part on the RoHC context.

53. A non-transitory computer-readable medium storing computer executable code for wireless communication, comprising:
code for causing at least one computer to obtain a packet including one or more robust header compression (RoHC) headers comprising a context identifier, and at least one RoHC header corresponding to a compressed general packet radio service (GPRS) tunneling protocol (GTP) header, wherein the compressed GTP header is determined based on a message type in the GTP header indicating a GTP protocol data unit;
code for causing the at least one computer to determine a GTP RoHC profile for decompressing the one or more RoHC headers based on the context identifier, the selected GTP RoHC profile being one of a plurality of RoHC profiles; and
code for causing the at least one computer to recursively apply RoHC to the one or more RoHC headers according to the selected GTP RoHC profile, to decompress the one or more RoHC headers to corresponding GTP headers.

54. The non-transitory computer-readable medium of claim 53, wherein the computer-readable medium further comprises code for causing the at least one computer to discern a RoHC context related to the context identifier, and the code for causing the at least one computer to determine determines the GTP RoHC profile based at least in part on the RoHC context.

55. The non-transitory computer-readable medium of claim 54, wherein the computer-readable medium further comprises code for causing the at least one computer to receive the RoHC context from an access point.

56. The non-transitory computer-readable medium of claim 54, wherein the code for causing the at least one computer to decompress decompresses the one or more RoHC headers using RoHC based at least in part on one or more parameters in the RoHC context.

57. An apparatus, comprising:
a receiving component that obtains a packet including one or more robust header compression (RoHC) headers comprising a context identifier and a protocol type, and at least one RoHC header corresponding to a compressed general packet radio service (GPRS) tunneling protocol (GTP) header, wherein the compressed GTP header is determined based on a message type in the GTP header indicating a GTP protocol data unit;
a RoHC profile determining component that discerns the protocol type is a GTP and selects a GTP RoHC profile for decompressing the one or more RoHC headers based at least in part on the context identifier, the selected GTP RoHC profile being one of a plurality of RoHC profiles; and
a RoHC applying component that recursively applies RoHC to the one or more RoHC headers according to the selected GTP RoHC profile, to decompress the one or more RoHC headers to corresponding GTP headers.

58. The apparatus of claim 57, wherein the RoHC applying component determines a RoHC context related to the context identifier.

59. The apparatus of claim 58, wherein the receiving component obtains the RoHC context from an access point.

60. The apparatus of claim 58, wherein the RoHC applying component applies RoHC to the one or more RoHC headers based at least in part on the RoHC context.

* * * * *